US011252598B2

(12) United States Patent
Pan et al.

(10) Patent No.: US 11,252,598 B2
(45) Date of Patent: Feb. 15, 2022

(54) METHOD AND APPARATUS FOR SIDELINK LOGICAL CHANNEL ESTABLISHMENT IN A WIRELESS COMMUNICATION SYSTEM

(71) Applicant: ASUSTek Computer Inc., Taipei (TW)

(72) Inventors: Li-Te Pan, Taipei (TW); Richard Lee-Chee Kuo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/801,614

(22) Filed: Feb. 26, 2020

(65) Prior Publication Data
US 2020/0296619 A1 Sep. 17, 2020

Related U.S. Application Data

(60) Provisional application No. 62/877,722, filed on Jul. 23, 2019, provisional application No. 62/818,380, filed on Mar. 14, 2019.

(51) Int. Cl.
*H04W 28/02* (2009.01)
*H04W 4/40* (2018.01)
(Continued)

(52) U.S. Cl.
CPC ......... *H04W 28/0268* (2013.01); *H04W 4/40* (2018.02); *H04W 28/12* (2013.01); *H04W 76/27* (2018.02); *H04W 92/18* (2013.01)

(58) Field of Classification Search
CPC . H04W 28/0268; H04W 28/12; H04W 92/18; H04W 76/27; H04W 4/40
(Continued)

(56) References Cited

U.S. PATENT DOCUMENTS

2019/0124015 A1\* 4/2019 Loehr ..................... H04L 47/24
2019/0215685 A1\* 7/2019 Wang ..................... H04W 72/02
(Continued)

FOREIGN PATENT DOCUMENTS

EP 3273634 1/2018
WO 2018074874 4/2018

OTHER PUBLICATIONS

European Search Report from corresponding EP Application No. 20159444.7, dated Aug. 14, 2020.
(Continued)

*Primary Examiner* — Chi Tang P Cheng
(74) *Attorney, Agent, or Firm* — Skaar Ulbrich Macari, P.A.

(57) ABSTRACT

A method and apparatus are disclosed from the perspective of a first UE (User Equipment) to perform sidelink logical channel (SL LCH) establishment. In one embodiment, the method includes the first UE storing a list of sidelink configurations, wherein each entry in the list contains one sidelink configuration and at least one PC5 QoS identifier (PQI) associated with the one sidelink configuration. The method further includes the first UE selecting an entry in the list according to a PQI of a PC5 QoS flow from a sidelink service. The method also includes the first UE establishing a SL LCH for the PC5 QoS flow according to a sidelink configuration of the entry and assigning an identity for the SL LCH. In addition, the method includes the first UE transmitting information to a second UE for the second UE to establish the SL LCH, wherein the information includes at least the identity of the SL LCH, an identity of the PC5 QoS flow, and Transmission-Reception (TX-RX) aligned parameters included in the sidelink configuration. Furthermore, the method includes the first UE transmitting sidelink packet(s) from the PC5 QoS flow on the SL LCH.

10 Claims, 19 Drawing Sheets

(51) Int. Cl.
*H04W 76/27* (2018.01)
*H04W 28/12* (2009.01)
*H04W 92/18* (2009.01)

(58) Field of Classification Search
USPC .......................................................... 370/329
See application file for complete search history.

(56) References Cited

U.S. PATENT DOCUMENTS

2019/0239039 A1* 8/2019 Hahn .................. H04W 84/005
2019/0239112 A1* 8/2019 Rao ................... H04W 72/0406

OTHER PUBLICATIONS

Intel Corporation, "SL V2X user plane aspects", 3GPP DRAFT, R2-1900883.

3rd Generation Partnership Project; Technical Specification Group Radio Access Network; NR; Study on Vehicle-to-Everything (Release 16), 3GPP DRAFT; DRAFT_TR 38.885 V2.0.0 R1, 650, Route Des Lucioles; F-06921 Sophia-Antipolis Cedex; France, Mar. 8, 2019 (Mar. 8, 2019), XP051687051.

Huawei (Rapporteur); "Summary of Email Discussion 9104#58][NR V2X]-QoS Support for NR V2X", 3GPP Draft; R2-1900370 Summary of Email Discussion.

Ericsson: "Traffic Management in V2X", 3GPP DRAFT; R2-162820-Traffic Management in V2X, 3rd Generation Partnership Project (3GPP), Mobile Competence Centre; 650, Route Des Lucioles; F-06921 Sophia-Antipolis Cedex, France.

Office Action from Japan Patent Office in corresponding JP Application No. 2020-029979, dated Jun. 15, 2021.

Huawei (Rapporteur), "Summary of Email Discussion [104#58][NR V2X]-QoS support for NR V2X", Agenda Item: 11.4.5, Discussion and Decision, R2-1900370, 3GPP TSG-RAN WG2 Meeting #105, Athens, Greece, Feb. 25-Mar. 2019.

Office Action from Intellectual Property India in corresponding IN Application No. 202014008073, dated Jun. 2, 2021.

Huawei (Rapporteur), "Summary of Email Discussion [104#58][NR V2X]—QoS Support for NR V2X", Discussion and Decision, 11.4.5, R2-1900370, 3GPP TSG-RAN WG2 Meeting #105, Athens, Greece, Feb. 25-Mar. 1, 2019.

Notice of Submission of Opinion from Korean Intellectual Property Office in corresponding KR Application No. 10-2020-0023884, dated Apr. 27, 2021.

Qualcomm Incorporated, "Discussion on QoS design for NR PC5 Communication", Discussion, Decision, Agenda Item 11.4.5, R2-1901729, 3GPP TSG-RAN WG2 Meeting #105, Athens, Greece, Feb. 25-Mar. 1, 2019.

Huawei, "Summary of Email Discussion [104#58][NR V2X]-QoS support for NR V2X", Discussion and Decision, Agenda Item 11.4.5, R2-1900370, 3GPP TSG-RAN WG2 Meeting #105, Athens, Greece, Feb. 25-Mar. 1, 2019.

* cited by examiner

R/R/E/LCID sub-header

| Index | LCID values |
|---|---|
| 00000 | Reserved |
| 00001-01010 | Identity of the logical channel |
| 01011-10100 | Identity of the logical channel which is used for duplication |
| 10101-11011 | Reserved |
| 11100 | PC5-S messages that are not protected |
| 11101 | PC5-S messages "Direct Security Mode Command" and "Direct Security Mode Complete" |
| 11110 | Other PC5-S messages that are protected |
| 11111 | Padding |

FIG. 13 (PRIOR ART)

| Index | Size of Length field (in bits) |
|---|---|
| 0 | 7 |
| 1 | 15 |

FIG. 14 (PRIOR ART)

| Index | QoS flow IDs | Mapped SLRB | AS configurations |
|---|---|---|---|
| 1 | QFI1/2 | SLRB1 | AS configuration1 |
| 2 | QFI3/4 | SLRB2 | AS configuration2 |
| 3 | QFI5/6 | SLRB3 | AS configuration3 |
| 4 | QFI7/8 | SLRB4 | AS configuration4 |
| 5 | QFI9/10 | SLRB5 | AS configuration5 |
| 6 | QFI11/12 | SLRB6 | AS configuration6 |
| 7 | QFI13/14 | SLRB7 | AS configuration7 |
| 8 | QFI15/16 | SLRB8 | AS configuration8 |
| 9 | QFI17/18 | SLRB9 | AS configuration9 |
| 10 | QFI19/20 | SLRB10 | AS configuration10 |
| 11 | QFI21/22 | SLRB11 | AS configuration11 |
| 12 | QFI23/24 | SLRB12 | AS configuration12 |
| 13 | QFI25/26 | SLRB13 | AS configuration13 |
| 14 | QFI27/28 | SLRB14 | AS configuration14 |
| 15 | QFI29/30 | SLRB15 | AS configuration15 |
| 16 | QFI31/32 | SLRB16 | AS configuration16 |

FIG. 15

| Index | QoS flow IDs | AS configurations |
|---|---|---|
| 1 | QFI1/2 | AS configuration1 |
| 2 | QFI3/4 | AS configuration2 |
| 3 | QFI5/6 | AS configuration3 |
| 4 | QFI7/8 | AS configuration4 |
| 5 | QFI9/10 | AS configuration5 |
| 6 | QFI11/12 | AS configuration6 |
| 7 | QFI13/14 | AS configuration7 |
| 8 | QFI15/16 | AS configuration8 |
| 9 | QFI17 | AS configuration9 |
| 10 | QFI18 | AS configuration10 |
| 11 | QFI19 | AS configuration11 |
| 12 | QFI20 | AS configuration12 |
| 13 | QFI21 | AS configuration13 |
| 14 | QFI22 | AS configuration14 |
| 15 | QFI23 | AS configuration15 |
| 16 | QFI24 | AS configuration16 |
| 17 | QFI25 | AS configuration17 |
| 18 | QFI26 | AS configuration18 |
| 19 | QFI27 | AS configuration19 |
| 20 | QFI28 | AS configuration20 |
| 21 | QFI29 | AS configuration21 |
| 22 | QFI30 | AS configuration22 |
| 23 | QFI31 | AS configuration23 |
| 24 | QFI32 | AS configuration24 |

FIG. 16

| Index | PC5 QoS profiles | AS configurations |
|---|---|---|
| 1 | PQI 1/2 | AS configuration1 |
| 2 | PQI 3/4 | AS configuration2 |
| 3 | PQI 5/6 | AS configuration3 |
| 4 | PQI 7/8 | AS configuration4 |
| 5 | PQI 9/10 | AS configuration5 |
| 6 | PQI 11/12 | AS configuration6 |
| 7 | PQI 13/14 | AS configuration7 |
| 8 | PQI 15/16 | AS configuration8 |
| 9 | PQI 17 | AS configuration9 |
| 10 | PQI 18 | AS configuration10 |
| 11 | PQI 19 | AS configuration11 |
| 12 | PQI 20 | AS configuration12 |
| 13 | PQI 21 | AS configuration13 |
| 14 | PQI 22 | AS configuration14 |
| 15 | PQI 23 | AS configuration15 |
| 16 | PQI 24 | AS configuration16 |
| 17 | PQI 25 | AS configuration17 |
| 18 | PQI 26 | AS configuration18 |
| 19 | PQI 27 | AS configuration19 |
| 20 | PQI 28 | AS configuration20 |
| 21 | PQI 29 | AS configuration21 |
| 22 | PQI 30 | AS configuration22 |
| 23 | PQI 31 | AS configuration23 |
| 24 | PQI 32 | AS configuration24 |

FIG. 17

| Items | LCID | PC5 QoS IDs | TX-RX aligned parameters |
|---|---|---|---|
| 1 | LCID1 | PQI1/2/3/4 | Set 1 |
| 2 | LCID2 | PQI5/6/7 | Set 2 |
| 3 | LCID3 | PQI8/9 | Set 3 |
| 4 | LCID4 | PQI10/11 | Set 4 |
| 5 | LCID5 | PQI12/13 | Set 5 |
| 6 | LCID6 | PQI14/15 | Set 6 |
| 7 | LCID7 | PQI16/17/18 | Set 7 |
| 8 | LCID8 | PQI19/20/21 | Set 8 |
| 9 | LCID9 | PQI22/23/24/25 | Set 9 |
| 10 | LCID10 | PQI26/27/28/29/30 | Set 10 |

FIG. 18

| Items | PC5 QoS IDs | TX-RX aligned parameters |
|---|---|---|
| 1 | PQI1 | Set 1 |
| 2 | PQI2 | Set 2 |
| 3 | PQI3 | Set 3 |
| 4 | PQI4 | Set 4 |
| 5 | PQI5 | Set 5 |
| 6 | PQI6 | Set 6 |
| 7 | PQI7 | Set 7 |
| 8 | PQI8 | Set 8 |
| 9 | PQI9 | Set 9 |
| 10 | PQI10 | Set 10 |
| 11 | PQI11 | Set 11 |
| 12 | PQI12 | Set 12 |
| 13 | PQI13 | Set 13 |
| 14 | PQI14 | Set 14 |
| 15 | PQI15 | Set 15 |
| 16 | PQI16 | Set 16 |
| 17 | PQI17 | Set 17 |
| 18 | PQI18 | Set 18 |
| 19 | PQI10 | Set 19 |
| 20 | PQI20 | Set 20 |
| 21 | PQI21 | Set 21 |
| 22 | PQI22 | Set 22 |
| 23 | PQI23 | Set 23 |
| 24 | PQI24 | Set 24 |
| 25 | PQI25 | Set 25 |
| 26 | PQI26 | Set 26 |
| 27 | PQI27 | Set 27 |
| 28 | PQI28 | Set 28 |
| 29 | PQI29 | Set 29 |
| 30 | PQI30 | Set 30 |

FIG. 19

METHOD AND APPARATUS FOR SIDELINK LOGICAL CHANNEL ESTABLISHMENT IN A WIRELESS COMMUNICATION SYSTEM

CROSS-REFERENCE TO RELATED APPLICATIONS

The present Application claims the benefit of U.S. Provisional Patent Application Ser. No. 62/818,380 filed on Mar. 14, 2019, and U.S. Provisional Patent Application Ser. No. 62/877,722 filed on Jul. 23, 2019, the entire disclosures of which are incorporated herein in its entirety by reference.

FIELD

This disclosure generally relates to wireless communication networks, and more particularly, to a method and apparatus for sidelink logical channel establishment in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a first UE (User Equipment) to perform sidelink logical channel (SL LCH) establishment. In one embodiment, the method includes the first UE storing a list of sidelink configurations, wherein each entry in the list contains one sidelink configuration and at least one PC5 QoS identifier (PQI) associated with the one sidelink configuration. The method further includes the first UE selecting an entry in the list according to a PQI of a PC5 QoS flow from a sidelink service. The method also includes the first UE establishing a SL LCH for the PC5 QoS flow according to a sidelink configuration of the entry and assigning an identity for the SL LCH. In addition, the method includes the first UE transmitting information to a second UE for the second UE to establish the SL LCH, wherein the information includes at least the identity of the SL LCH, an identity of the PC5 QoS flow, and Transmission-Reception (TX-RX) aligned parameters included in the sidelink configuration. Furthermore, the method includes the first UE transmitting sidelink packet(s) from the PC5 QoS flow on the SL LCH.

BRIEF DESCRIPTION OF THE DRAWINGS

FIG. 13 is a reproduction of Table 6.2.4-1 of 3GPP TS 36.321 V15.3.0.

FIG. 14 is a reproduction of Table 6.2.4-2 of 3GPP TS 36.321 V15.3.0.

FIG. 15 is a mapping table according to one exemplary embodiment.

FIG. 16 is a mapping table according to one exemplary embodiment.

FIG. 17 is a mapping table according to one exemplary embodiment.

FIG. 18 is a mapping table according to one exemplary embodiment.

FIG. 19 is a mapping table according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: 3GPP RAN2 #104 Chairman's Note; TR 23.786 V1.0.0, "Study on architecture enhancements for EPS and 5G System to support advanced V2X services"; R2-1900370, "Summary of Email Discussion [104 #58][NR V2X]—QoS support for NR V2X"; TS 36.300 V15.3.0, entitled "Evolved Universal Terrestrial Radio Access (E-UTRA) and Evolved Universal Terrestrial Radio Access Network (E-UTRAN); Overall description"; R2-1903001, "Report of 3GPP TSG RAN2 #105 meeting"; R2-1908107, "Report from session on LTE V2X and NR V2X"; TS 23.287 V1.0.0, "Architecture enhancements for 5G System (5GS) to support Vehicle-to-Everything (V2X) services"; TS 36.321 V15.3.0, "Evolved Universal Terrestrial Radio Access (E-UTRA); Medium Access Control (MAC) protocol specification"; and R2-1907454, "Details about NR SL QoS handling". The standards and documents listed above are hereby expressly incorporated by reference in their entirety.

Figure 1:
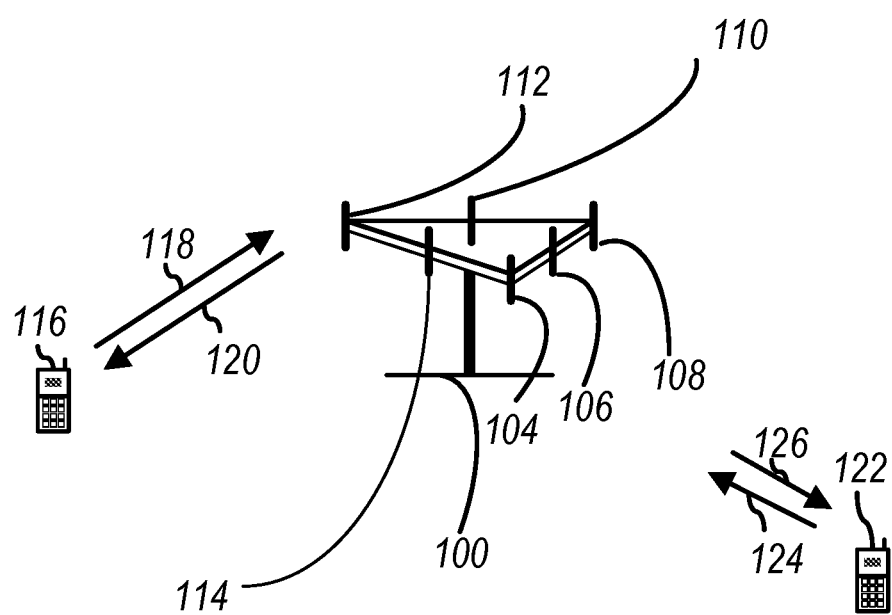
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
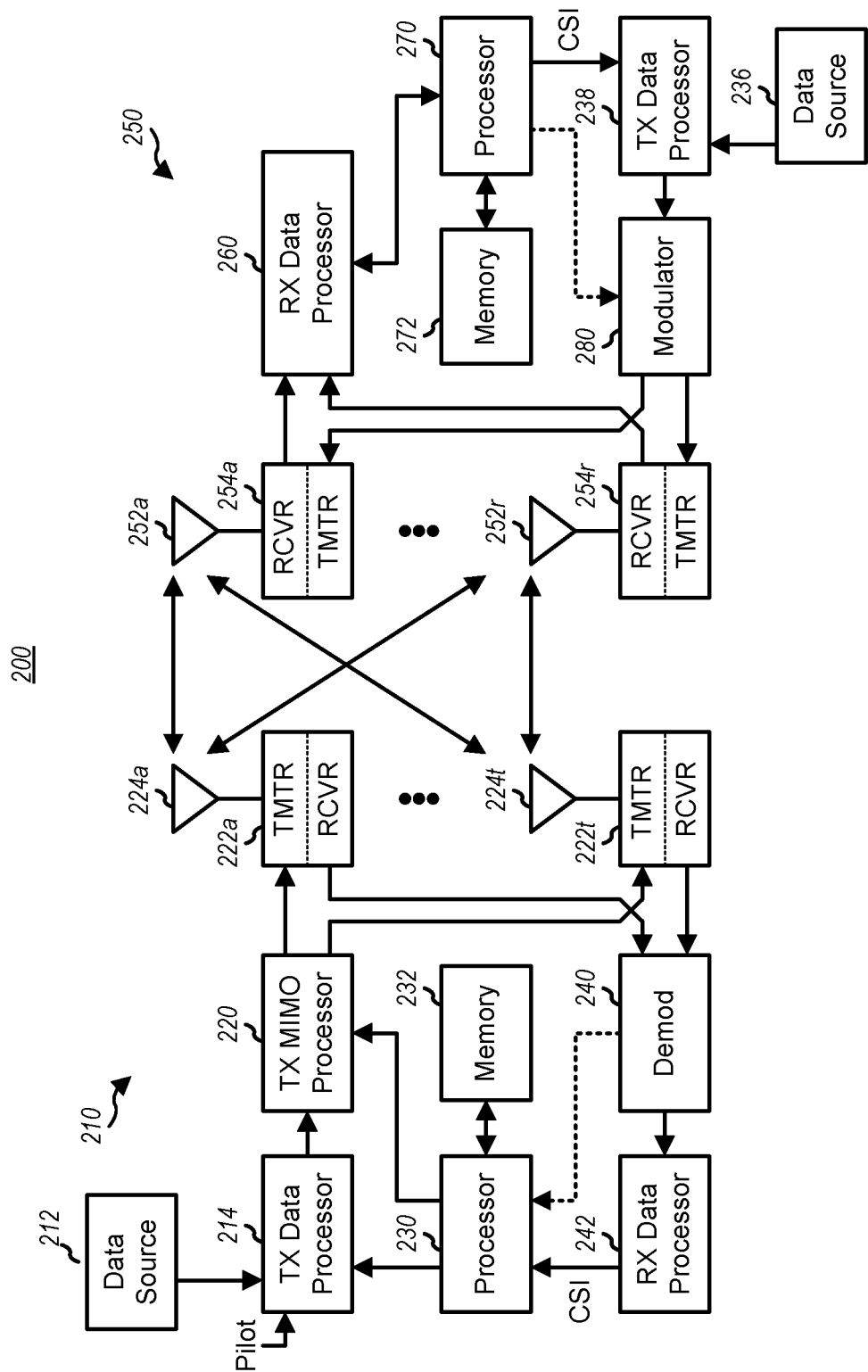
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
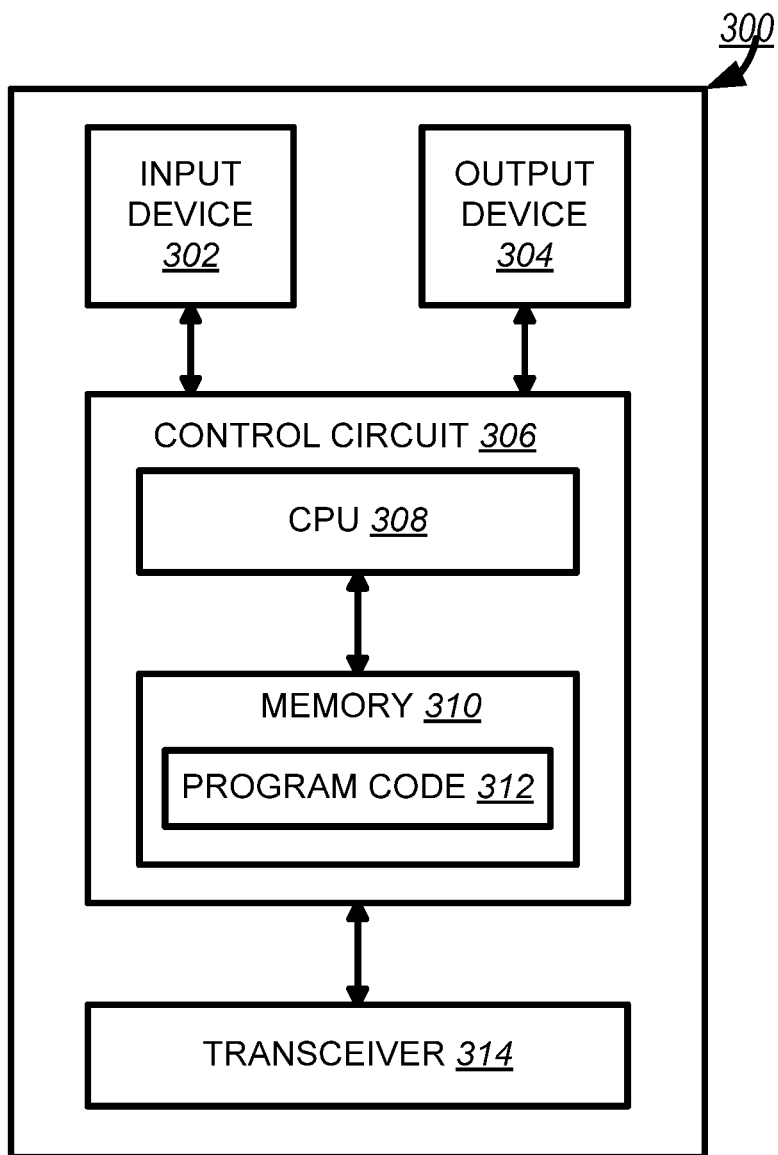
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE or NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
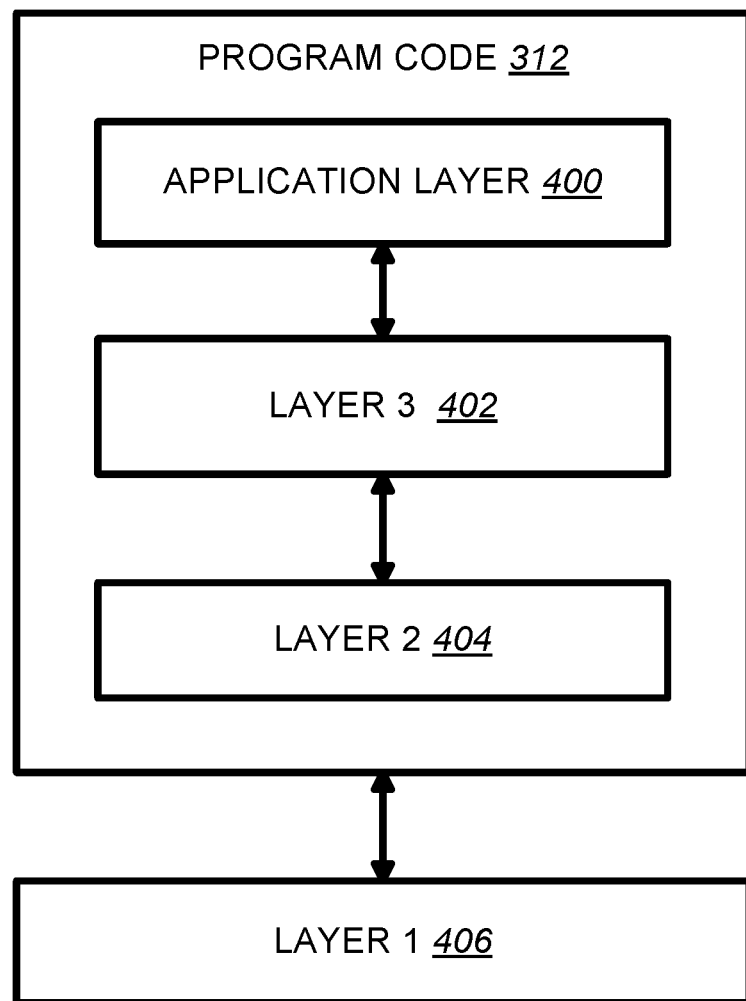
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP RAN2 #104 meeting made the following agreements on NR eV2X sidelink communications (as discussed in the 3GPP RAN2 #104 Chairman's note):

| Agreements |
|---|
| 1: NR V2X sidelink communication is supported for all RRC_CONNECTED UEs, RRC_IDLE UEs and RRC_INACTIVE UEs (if supported). A UE in RRC_INACTIVE (if supported) performs V2X sidelink communication following the same way as RRC_IDLE UEs, i.e. using cell-specific configurations included in SIB. |

| Agreements on unicast |
|---|
| 1: For AS-level information required to exchange among UEs via sidelink for SL unicast, RAN2 can consider the followings as a baseline and will check if the AS-level information can be agreed and the details after some progress in RAN2, SA2 and RAN1: UE ID, UE capability, Radio/Bearer configuration, PHY information/configuration (e.g. HARQ, CSI), Resource information/configuration and QoS info
2: AS-level information for SL unicast can be exchanged between gNB and UE for RRC configuration. RAN2 assumes that a UE can provide network with QoS related information and will check if the AS-level information can be agreed and the details after some progress in RAN2, SA2 and RAN1.
3: AS-level information is exchanged via RRC signalling (e.g. PC5-RRC) among UEs via sidelink for SL unicast. New logical channel (SCCH: SL Control Channel) in addition to STCH (SL Traffic Channel) will be also introduced. SCCH carriers PC5-RRC messages. |

3GPP TR 23.786 V1.0.0 introduces the following solutions for eV2X communications as follows:

6.11 Solution #11: Solution for Unicast or Multicast for eV2X Communication Over PC5 Reference Point 6.11.3 Procedures 6.11.3.1 Establishment of Layer 2 Link Over PC5

Layer-2 link establishment procedure as defined in TS 23.303 [8] clause 5.4.5.2 can be reused for the eV2X unicast link establishment, with the following adaptations:

The messages may be converted to RRC signaling message instead of PC5 signaling message, depends on RAN WG's decision.

"UE oriented layer 2 link establishment" operates as below and Figure 6.11.3.1-1 shows the procedure:

The Direct Communication Request message can be sent by UE-1 with broadcast mechanism, i.e. to a broadcast address associated with the application instead of the L2 ID of UE-2. The upper identifier of UE-2 is included in the Direct Communication Request message to allow UE-2 to decide on if to respond to the request. The Source L2 ID of this message should be the unicast L2 ID of the UE-1.

The Direct Communication Request message should be transmitted using default AS layer setting e.g. broadcast setting, that can be understood by UE-2.

UE-2 uses the source L2 ID of the received Direct Communication Request message as destination L2 ID in the subsequent signalling to UE-1, and uses its own unicast L2 ID as the source L2 ID. UE-1 obtains UE-2's L2 ID for future communication, for signalling and data traffic.

[ . . . ]

Figure 6:
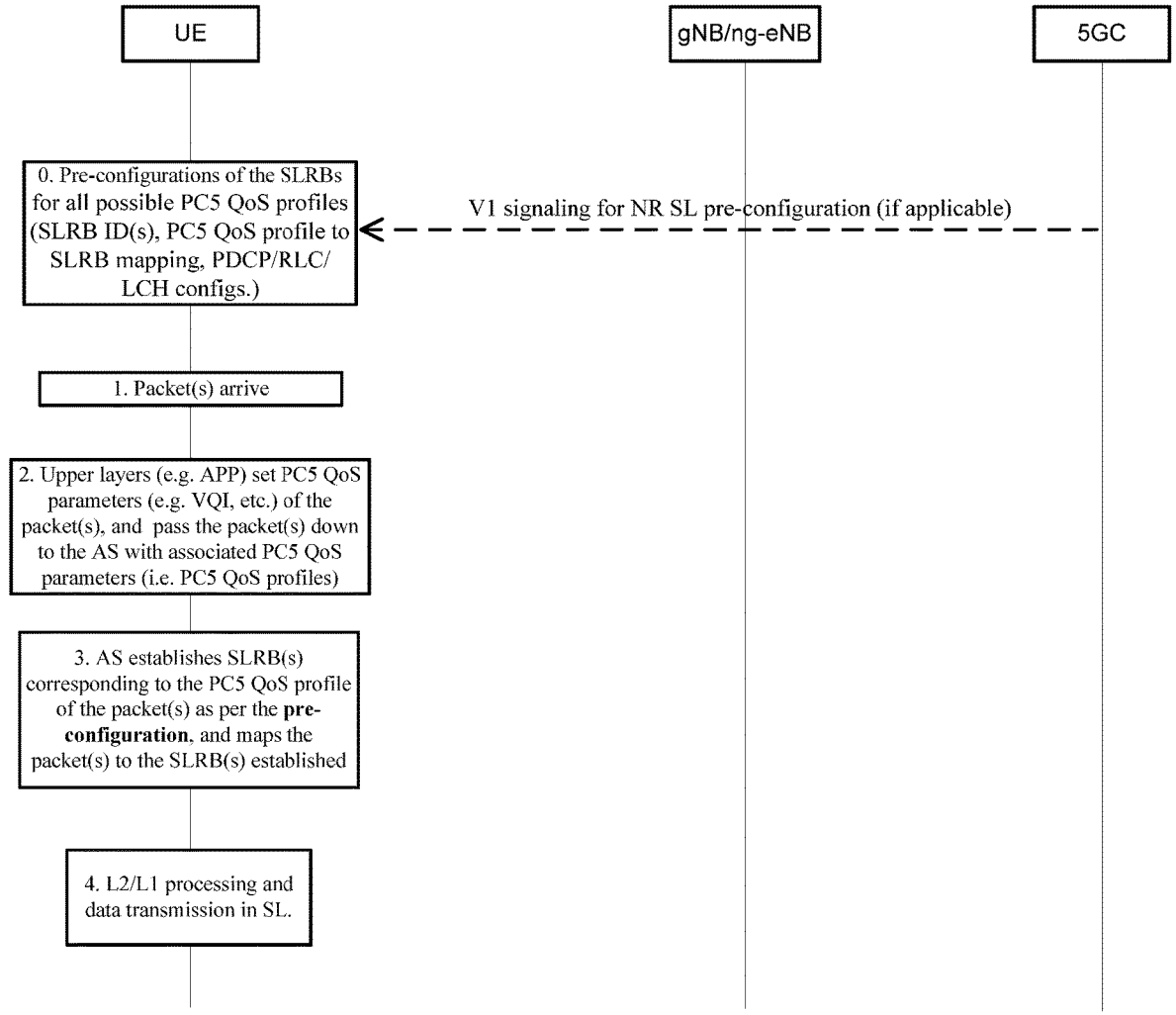
FIG. 6 is a reproduction of Figure A-4 of 3GPP R2-1900370.

Figure 6.11.3.1-1 of 3GPP TR 23.786 V1.0.0,
Entitled "UE Oriented Layer 2 Link Establishment
Procedure", is Omitted "V2X Service oriented layer 2 link establishment" operates same to the "UE oriented layer 2 link establishment" with the following differences and Figure 6.11.3.1-2 shows the procedure:

The information about V2X Service requesting L2 link establishment, i.e. information about the announced V2X Service is included in the Direct Communication Request message to allow other UEs to decide on if to respond to the request.

The UEs that are interested in using the V2X Service announced by the Direct Communication Request message can respond to the request (UE-2 and UE-4 in Figure 6.11.3.1-2).

After establishing layer 2 link with other UE(s) as described above, new UE(s) can enter proximity with UE-1, i.e. UE-1's direct communication range. In this case, UE-1 may initiate V2X Service oriented layer 2 link establishment procedure as it is aware of new UE(s) from Application Layer messages sent by the UE(s). Or the new UE may initiate V2X Service oriented layer 2 link establishment procedure. Therefore, UE-1 does not have to keep sending a Direct Communication Request message periodically to announce the V2X Service it wants to establish L2 link with other UE for unicast.

[ . . . ]

Figure 6.11.3.1-2 of 3GPP TR 23.786 V1.0.0,
Entitled "V2X Service Oriented Layer 2 Link
Establishment Procedure", is Omitted The layer 2 link supports the non-IP traffic. No IP address negotiation and allocation procedure would be carried out.
6.11.3.2 Contents of the Signalling Message for Link Establishment The information carried in Direct Communication Request message defined in TS 24.334 [13] requires at least the following updates:

For "UE oriented layer 2 link establishment",
 The User Info needs to include the target UE's ID (UE-2's upper layer ID), besides the initiating UE's ID (UE-Vs upper layer ID).
NOTE: Stage 3 can decide if these IDs can be carried in the same IE or separate IEs, for example, the Station ID/Vehicle Temp ID only needs to be 4 octets.

For "V2X Service oriented layer 2 link establishment",
 The Announced V2X Service Info needs to include the information about V2X Service requesting L2 link establishment, e.g. PSID or ITS-AIDS of the V2X application. Sensor Sharing, and etc can be the case for the V2X Service.

The IP Address Config, which is specified as mandatory for ProSe, should allow an indication that no IP is to be used, such that the receiving UE (e.g. UE-2) would not start any IP configuration procedure for this particular link.

The IEs dedicated for security need to be reviewed by SA3, as the security mechanism for eV2X may be different and requires different IEs.

Additional configuration information regarding the link, e.g. when RRC message is used there may be AS layer configurations.

[ . . . ]

6.19 Solution #19: QoS Support for eV2X Communication Over PC5 Interface 6.19.1 Functional Description 6.19.1.1 General Description This solution addresses Key Issue #4 (clause 5.4) Support of PC5 QoS framework enhancement for eV2X. The QoS requirements for eV2X are different from that of the EPS V2X, and the previous defined PPPP/PPPR in TS 23.285 [5] are considered not to satisfy the needs. Specifically, there are much more QoS parameters to consider for the eV2X services. This solution proposes to use 5QI for eV2X communication over PC5 interface. This allows a unified QoS model for eV2X services over different links.

6.19.1.2 Solution Description

The new service requirements were captured in TS 22.186 [4]. The new performances KPIs were specified with the following parameters:
 Payload (Bytes);
 Transmission rate (Message/Sec);
 Maximum end-to-end latency (ms);
 Reliability (%);
 Data rate (Mbps);
 Minimum required communication range (meters).

Note that the same set of service requirements apply to both PC5 based V2X communication and Uu based V2X communication. As analysed in Solution #2 (clause 6.2), these QoS characteristics could be well represented with 5QI defined in TS 23.501 [7].

It is therefore possible to have a unified QoS model for PC5 and Uu, i.e. also use 5QIs for V2X communication over PC5, such that the application layer can have a consistent way of indicating QoS requirements regardless of the link used. This does not prevent the AS layer from implementing different mechanisms over PC5 and Uu to achieve the QoS requirements.

Considering the 5GS V2X capable UEs, there are three different types of traffic: broadcast, multicast, and unicast.

The UE-PC5-AMBR is applied to all types of traffic and is used for the RAN for capping the UE PC5 transmission in the resources management.

For unicast type of traffic, it is clear that the same QoS Model as that of Uu can be utilized, i.e. each of the unicast link could be treated as a bearer, and QoS flows could be associated with it. All the QoS characteristics defined in 5QI and the additional parameter of data rate could apply. In addition, the Minimum required communication range could be treated as an additional parameter specifically for PC5 use.

For broadcast traffic, there is no bearer concept. Therefore, each of the message may have different characteristics according to the application requirements. The 5QI should then be used in the similar manner as that of the PPPP/PPPR, i.e. to be tagged with each of the packet. 5QI is able to represent all the characteristics needed for the PC5 broadcast operation, e.g. latency, priority, reliability, etc. A group of V2X broadcast specific 5QIs (i.e. VQIs) could be defined for PC5 use.

NOTE 1: The 5QI used for PC5 may be different from that used for Uu even for the same V2X service, e.g. the PDB for the PC5 can be longer than that for the Uu as it is a direct link. The 5QIs used for PC5 is named VQI for differentiation.

NOTE 2: A mapping between the EPS V2X QoS parameters, e.g. PPPP and PPPR, with the new VQIs, e.g. similar to the non-GBR 5QIs defined in TS 23.501 [7], will be defined in normative phase for broadcast operation.

NOTE 3: The working assumption is that NR PC5 design support the use of V2X 5QIs.

NOTE 4: AS layer may handle unicast, groupcast and broadcast traffic by taking all their priorities, e.g. indicated by VQI, into account.

6.19.1.3 V2X 5QI (VQI) Values for PC5 Broadcast Use

A set of new VQIs for V2X use will be defined in normative phase reflecting the service requirements documented in TS 22.186 [4].

NOTE 1: The working assumption is that non-standardized VQI is not supported in this release.

NOTE 2: Whether per packet or per QoS flow QoS Model is used depends on RAN decision.

6.19.2 Procedures

Editor's note: This clause describes procedures to use the new QoS model for PC5 communication. It depends on RAN development as well.

6.19.2.1 QoS support for Unicast Communication Over PC5 Interface 6.19.2.1.0 General To enable QoS support for eV2X one-to-one communication over PC5 interface, the followings procedures need to be supported.

Editor's note: The following procedures may be further updated depending on the progress on PC5 QoS Model.

6.19.2.1.1 QoS Parameters Provision to UE and NG-RAN

The PC5 QoS parameters and PC5 QoS rule are provisioned to the UE as part of service authorization parameters using the solution defined for Key Issue #5. The PC5 QoS rule is used to map the V2X services (e.g. PSID or ITS-AIDS of the V2X application) to the PC5 QoS flow.

The PC5 QoS parameters retrieved by the PCF from the UDR are provided to the NG-RAN via AMF. The AMF stores such information as part of the UE context. For subsequent procedures (e.g., Service request, Handover), the provision of the PC5 QoS parameters via N2 will follow the description as per clause 6.6.2.

NOTE 1: The UE-PC5-AMBR is provided by the UDM and the details will follow the description as per Solution #6.

The PC5 QoS parameters provisioning to the UE and NG-RAN could be triggered by the UE Policy container included in the NAS message provided by the UE. The PCF sends to the AMF the updated PC5 QoS parameters for NG-RAN when needed.

NOTE 2: The detailed PC5 QoS parameters used by NG-RAN will be identified during the normative work phase.

NOTE 3: NG-RAN is configured with static parameters for network scheduled resources allocation mode to support PC5 QoS.

6.19.2.1.2 QoS Parameters Negotiation Between UEs

The PC5 QoS parameters are negotiated at the establishment of one-to-one communication procedure, so the one-to-one communication establishment procedure defined in TS 23.303 [8] is enhanced to support PC5 QoS parameters negotiation between two UEs. After the PC5 QoS parameters negotiation procedure, the same QoS is used in both directions.

[ . . . ]

Figure 6.19.2.1.2-1 of 3GPP TR 23.786 V1.0.0, Entitled "Establishment of Secure Layer-2 Link Over PC5", is Omitted UEs engaged in one to one communication negotiate PC5 QoS parameters during the link establishment procedure.
1. UE-1 sends a Direct Communication Request message to UE-2 in order to trigger mutual authentication. This message includes the requested PC5 QoS parameters.
2. UE-2 initiates the procedure for mutual authentication. The UE-2 includes the accepted PC5 QoS parameters in the Response message.

NOTE: This procedure is aligned with Solution #11 (clause 6.11).

6.19.2.1.3 QoS Handling for eV2X Communication

When PC5 unicast is used for the transmission of eV2X messages, the following principles are applied for both network scheduled operation mode and UE autonomous resources selection mode:

PC5 QoS parameters defined in clause 6.19.1.2 applies to the eV2X communication over PC5.

The eV2X message is sent on the PC5 QoS flow established using the procedure described in clause 6.19.2.1.2.

The mapping of application layer eV2X message to PC5 QoS parameters is based on the PC5 QoS rule.

When the network scheduled operation mode is used, following additional principles apply:

UE provides PC5 QoS parameter information to the gNB for resources request.

When the gNB receives a request for PC5 resource from a UE, the gNB can authorize the requested PC5 QoS parameter based on the PC5 QoS parameters received from AMF.

gNB can use the PC5 QoS parameter information for PC5 QoS handling.

When the autonomous resources selection mode is used, following additional principle applies:

The UE can use the PC5 QoS parameter for PC5 QoS handling based on the provisioned information described in clause 6.19.2.1.1.

3GPP R2-1900370 includes the following 3GPP email discussion [104 #58][NR/V2X]:

In some contributions [11][12][13], it was pointed out that there might be the need for the receiver UE to be informed of some receiver-side relevant parameters corresponding to the SLRB(s) configured at the transmitter UE side, so as for the receiver to get aligned with the transmitter and correctly receive the data sent from corresponding SLRB(s). Such receiver-side related SLRB configurations may include sequence number space and RLC modes if they are configurable [13], and the reason is easy to understand: if these parameters are configurable, when a UE receives the data corresponding to an LCID, the UE has to be informed of the specific values set for these parameters by the transmitter on the corresponding SL LCH (and corresponding SLRB), in order to process the reception of the data correctly.

However, there were also some other reasonable views which indicate that similar to UE reception in DL there may be no QoS enforcement operation needed at the receiver in SL [11], or which treated such enforcement of receiver-side SLRB configurations by the transmitter as some forms of optimization [12]

In the following, therefore, it is worth discussing whether such receiver-side related SLRB configuration(s) informed to the receiver UE by the transmitter UE in NR SL is needed or not. Also, in LTE SL these receiver-side SLRB configurations are specified in STCH configuration in TS 36.331 [17, 9.1.1.6]), so that they do not need to be informed by the transmitter.

Question 5: Does the transmitter UE need to inform the receiver UE of any receiver-side related SLRB configurations in NR SL (so as to align transmitter and receiver on these configurations)? If yes, what are they?

a) Yes, the SN length used for reception of an SLRB needs to be informed (if configurable).

b) Yes, the RLC mode used for an SLRB needs to be informed (if configurable).

c) No. No such receiver-side SLRB configuration informed by the transmitter in NR SL is needed; they are specified configuration in the spec as in LTE SL.

d) Others. If selected, please clarify what other options are.

e) Yes, the PC5 QoS profile associated with each SLRB/ SL LCH established at the transmitter UE needs to be informed to the receiver UE.

f) Yes, SLRB-specific PHY configuration needs to be informed (e.g. HARQ/SFCI configuration)

g) Yes, receiver-side SLRB configuration configured by transmitter UE (e.g. t-Reordering, t-Reassemly, etc)

The appendix in 3GPP R2-1900370 describes several candidate options for NW (Network) configured/pre-configured SLRB (Sidelink Radio Bearer) as follows:

Appendix: Candidate Options for NW Configured/Pre-Configured SLRB

As per experience from LTE SL, UEs with different RRC states/resource allocation modes may depend on different ways of signaling and procedures for their SL (pre-)configuration (i.e. dedicated signaling, system information and pre-configuration). Therefore, options with different signaling flows are given below.
[ . . . ]
Option 3

Figure 5:
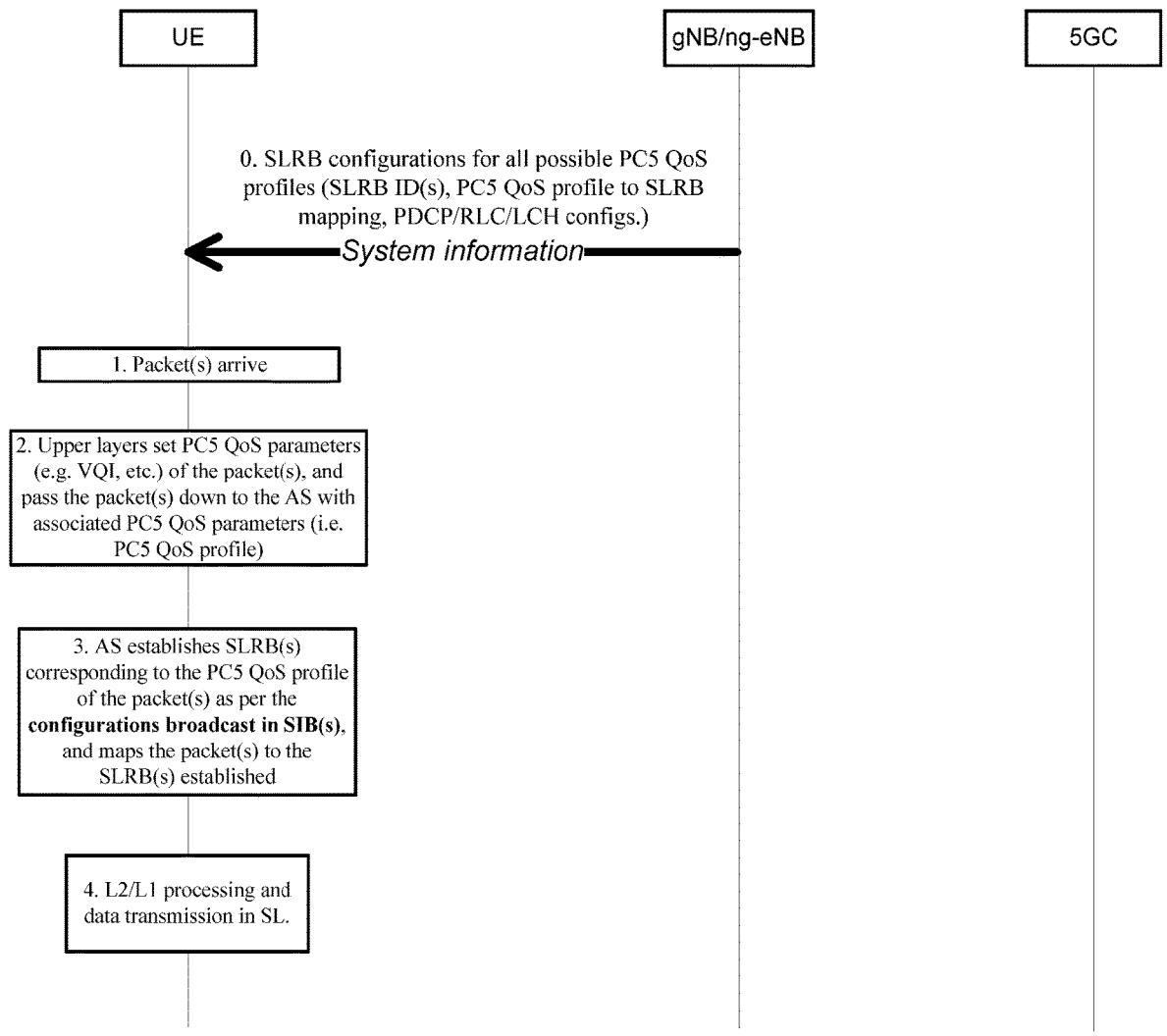
FIG. 5 is a reproduction of Figure A-3 of 3GPP R2-1900370.

Figure A-3 of 3GPP R2-1900370, Entitled "PC5 QoS Profile Based, Cell Specific Configuration (e.g. in V2X Specific SIB)", is Reproduced as FIG. 5

Option 3 is applied when one wants to apply NW-configured SLRB for RRC_IDLE/RRC_INACTIVE UEs as well. Specifically, in this option, the gNB/ng-eNB uses V2X specific SIB to broadcast the SLRB configuration associated with each possible PC5 QoS profiles. Then, when packet(s) with specific PC5 QoS profile(s) arrive as in Step 1 and 2, the UE then establishes the SLRB(s) corresponding to these QoS profile(s) as per the cell-specific configurations broadcast in the SIB and maps the packet(s) to the SLRB(s) established.
Applicability:
This option just turns the UE specific SLRB configurations, into cell-specific configurations. Though it is mainly designed for RRC_IDLE/RRC_INACTIVE UEs, it is technically usable for RRC_CONNECTED UEs as well.
Option 4

Figure A-4 of 3GPP R2-1900370, Entitled "PC5 QoS Profile Based, Pre-Configuration", is Reproduced as FIG. 6

Option 4 is mainly for out-of-coverage UEs, in case people want to also introduce pre-configured SLRB. Specifically, the SLRBs associated with all PC5 QoS profiles are pre-configured inside the UE (either via V1 signalling, pre-configured in UICC or per-configured in ME [1]). Then, as in Option 3, the UE autonomously setup SLRB(s) associated the PC5 QoS profile of the arriving packet(s) and maps the packet(s) to the associated SLRBs established.
Applicability:
This option mainly aims at out-of-coverage UEs, but it technically can be applied to all RRC_CONNECTED UEs, RRC_IDLE/RRC_CONNECTED UEs and out-of-coverage UEs (though pre-configuration is usually seen as inflexible).
Option 5

Figure 7:
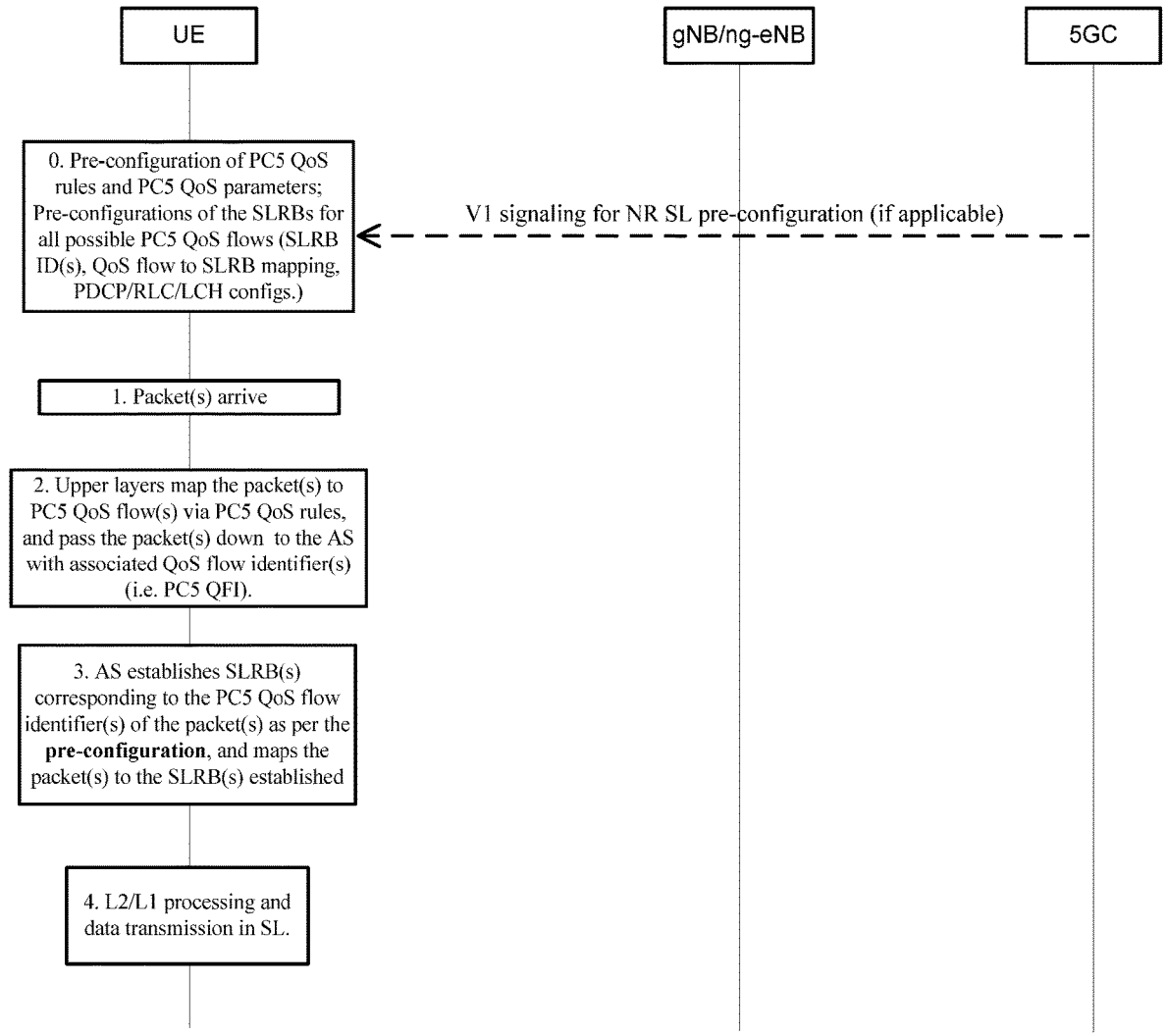
FIG. 7 is a reproduction of Figure A-5 of 3GPP R2-1900370.

Figure A-5 of 3GPP R2-1900370, Entitled "PC5 QoS Flow Based: Pre-Configuration", is Reproduced as FIG. 7

Similar to Option 4, Option 5 is to give a possible solution for the pre-configuration based method, which however, uses PC5 QoS flow instead. Specifically, both the PC5 QoS rules which are used in the upper layers for filtering and the SLRB configuration for each PC5 QoS flow in the AS layer should be pre-configured, as in Step 0. Then the UE will depend on the PC5 QoS flow identifier(s) associated with the packet(s) to map them into corresponding SLRBs for AS processing, as in Option 2 above.
Applicability:
This option mainly aims at out-of-coverage UEs, but it technically can be applied to all RRC_CONNECTED UEs, RRC_IDLE/RRC_CONNECTED UEs and out-of-coverage UEs.
3GPP TS 36.300 further introduces the mapping between sidelink radio bearers and sidelink logical channels as follows:

6 Layer 2
Layer 2 is split into the following sublayers: Medium Access Control (MAC), Radio Link Control (RLC) and Packet Data Convergence Protocol (PDCP).
This subclause gives a high level description of the Layer 2 sub-layers in terms of services and functions. The three figures below depict the PDCP/RLC/MAC architecture for downlink, uplink and Sidelink, where:
Service Access Points (SAP) for peer-to-peer communication are marked with circles at the interface between sublayers. The SAP between the physical layer and the MAC sublayer provides the transport channels. The SAPs between the MAC sublayer and the RLC sublayer provide the logical channels.
The multiplexing of several logical channels (i.e. radio bearers) on the same transport channel (i.e. transport block) is performed by the MAC sublayer;
In both uplink and downlink, when neither CA nor DC are configured, only one transport block is generated per TTI in the absence of spatial multiplexing;
In Sidelink, only one transport block is generated per TTI.
[ . . . ]

Figure 8:
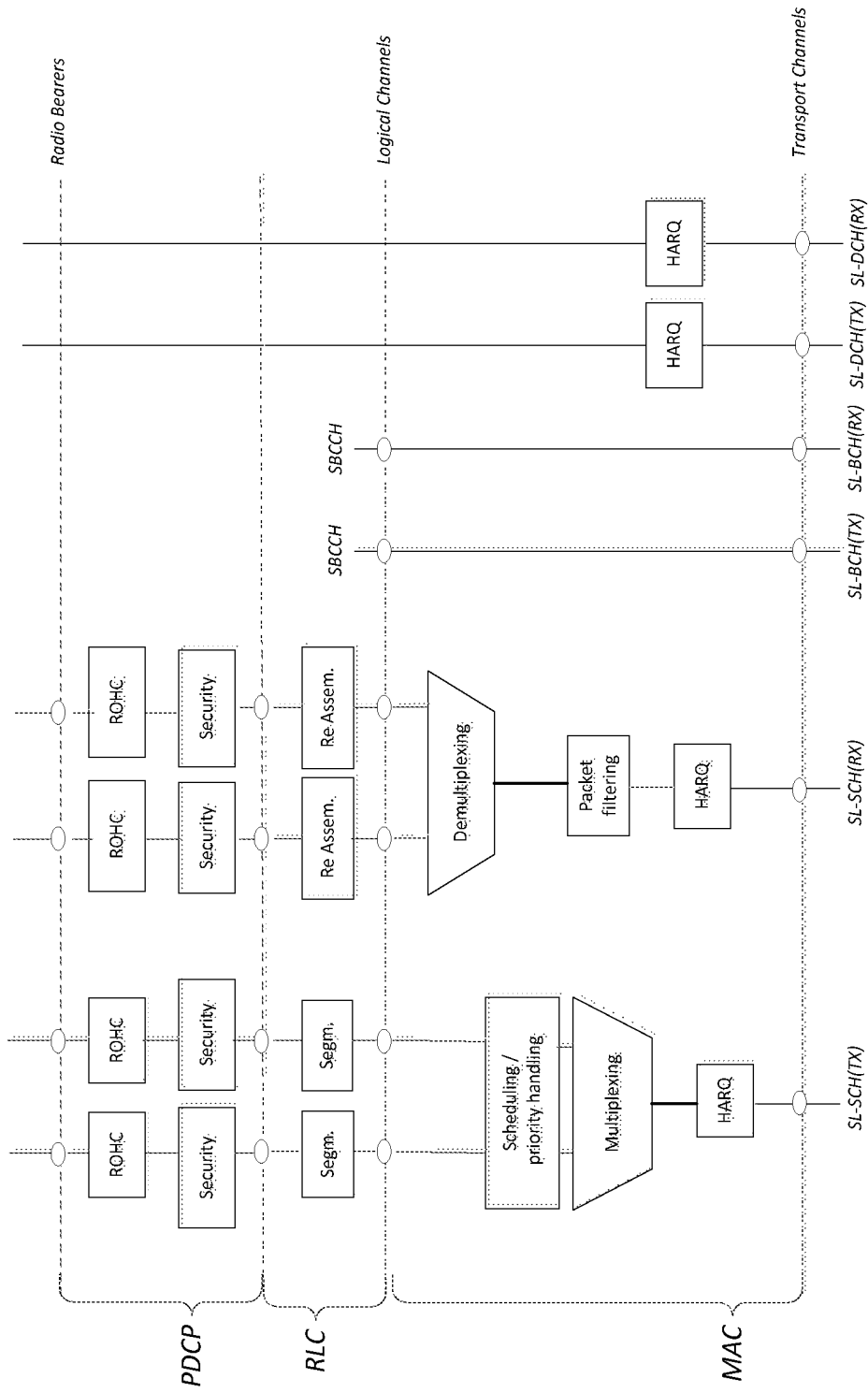
FIG. 8 is a reproduction of Figure 6-3 of 3GPP TS 36.300 V15.3.0.

Figure 6-3 of 3GPP TS 36.300 V15.3.0, Entitled "Layer 2 Structure for Sidelink", is Reproduced as FIG. 8

In 3GPP RAN2 #105 meeting, the following agreements on NR (New RAT/Radio) sidelink QoS (Quality of Service) were made (as discussed in 3GPP R2-1903001):

| Agreements on QoS: |
|---|
| 1: From the AS perspective, data rate requirements need to be further supported for NR SL, besides QoS metrics (i.e. priority, latency and reliability) as well as minimum required communication range concluded by RAN1.<br>2: From RAN2 perspective, PQI defined by SA2 for NR SL is feasible. Final decision on whether/how other QoS parameters are defined in addition to PQI is up to SA2.<br>3: For NR SL unicast, groupcast and broadcast, specific PC5 QoS parameters (e.g. PQI, etc) of V2X packets need to be instructed by the upper layers to the AS.<br>    4a: For V2X transmission in SL unicast, SLRB configurations are NW configured or preconfigured.<br>      The configuration of each SLRB may include transmission related parameters which do not need to be known by the peer UE, plus some parameters that are configured also need to be known by the peer UE.<br>    4b: From RAN2 perspective, per-flow QoS model is preferred for NR SL unicast.<br>    4c: The mapping between PC5 QoS flows and SLRBs is at least gNB/ng-eNB configured or pre-configured. RAN2 to further decide in which case(s) gNB/ng-eNB configuration and pre-configuration are applied respectively in WI.<br>    4d: Adopt the procedures in Option b and e (corresponding to Option 2 and 5 in Appendix respectively) for NR SL unicast.<br>5: For NR SL unicast, some SLRB configurations need to be informed by the one UE to the peer UE in SL, including at least SN length, RLC mode (related to also Q9) and PC5 QoS profile associated with each SLRB. Other SLRB related parameters are not excluded.<br>6: SDAP layer is needed at least for NR SL unicast, performing PC5 QoS flow to SLRB mapping. SDAP layer is notneeded for per-packet QoS model, e.g. broadcast.<br>7: RLC AM is supported for NR SL unicast. |

In the 3GPP RAN2 #106 meeting, the following agreements on NR sidelink QoS and SLRB (Sidelink Radio Bearer) configurations were made (as discussed in 3GPP R2-1908107):

| Agreements on NR SL QoS and SLRB configurations: |
|---|
| 1: Stick to SI phase conclusion that SLRB configurations should be NW-configured and/or pre-configured for NR SL.<br>2: For an RRC_CONNECTED UE, for transmission of a new PC5 QoS flow, it may report the QoS information of the PC5 QoS flow via RRC dedicated signalling to the gNB/ng-eNB. FFS on the exact timing about when UE initiates.<br>3: For an RRC_CONNECTED UE, the gNB/ng-eNB may provide SLRB configurations and configure the mapping of PC5 QoS flow to SLRB via RRC dedicated signalling, based on the QoS information reported by the UE. The UE can establishes/reconfigures the SLRB only after receiving the SLRB configuration. FFS when the UE establishes/reconfigures the SLRB.<br>4: FFS what the reported QoS information is (e.g. PFI, PC5 QoS profile, etc.) and what is used to realize the PC5 QoS flow to SLRB mapping (e.g PFI to SLRB mapping, QoS profile to SLRB mapping, etc.), depending on SA2 conclusion on how PFI is assigned.<br>5: For RRC_IDLE/INACTIVE UEs, the gNB/ng-eNB may provide SLRB configurations and configure the PC5 QoS profile to SLRB mapping via V2X-specific SIB. When an RRC_IDLE/INACTIVE UE initiates the transmission of a new PC5 QoS flow, it establishes the SLRB associated with the PC5 QoS profile of that flow based on SIB configuration.<br>6: FFS how to describe each PC5 QoS profile in the SIB, pending SA2's final conclusion on what PC5 QoS parameters are included in a PC5 QoS profile.<br>7: For OoC UEs, SLRB configurations and the mapping of PC5 QoS profile to SLRB are pre-configured. When an OoC UE initiates the transmission of a new PC5 QoS flow, it establishes the SLRB associated with the flow based on pre-configuration.<br>8: FFS what is used to realize for PC5 QoS flow to SLRB mapping in pre-configuration (e.g. PFI to SLRB mapping QoS profile to SLRB mapping, etc.), depending on SA2 conclusion on how PFI is assigned.<br>9: For SL unicast of a UE, the NW-configured/pre-configured SLRBs configurations include the SLRB parameters that are only related to TX, as well as the SLRB parameters that are related to both TX and RX and need to be aligned with the peer UEs.<br>10: For SL unicast, the initiating UE informs the peer UE of SLRB parameters that are related to both TX and RX and need to be aligned with the peer UEs. FFS on the detailed parameters.<br>11: For SL unicast, do not allow a UE to configure "SLRB parameters only related to TX" for the peer UE in SL via PC5 RRC message. FFS how to handle SRLB parameters only related to RX.<br>12: For SL groupcast and/or broadcast, the NW-configured/preconfigured SLRBs include the SLRB parameters that are only related to TX.<br>13: Those SLRB parameters which are related to both TX and RX and thus need to be aligned between a UE and all its peer UE(s) should be fixed in the Spec for SL groupcast and broadcast.<br>14: For SL broadcast, how to set SLRB parameters only related to RX is up to UE implementation. FFS for groupcast case.<br>15: SLRB configurations should be (pre-)configured for SL unicast, groupcast/broadcast separately. FFS on the need of separate SLRB configurations between groupcast and broadcast. |

3GPP TS 23.287 V1.0.0 specifies the following support for V2X services:

5.1.2 Authorization and Provisioning for V2X Communications Over PC5 Reference Point 5.1.2.1 Policy/Parameter Provisioning The following information for V2X communications over PC5 reference point is provisioned to the UE:

[ . . . ]

2) Radio parameters when the UE is "not served by E-UTRA" and "not served by NR":

Includes the radio parameters per PC5 RAT (i.e. LTE PC5, NR PC5) with Geographical Area(s) and an indication of whether they are "operator managed" or "non-operator managed". The UE uses the radio parameters to perform V2X communications over PC5 reference point when "not served by E-UTRA" and "not served by NR" only if the UE can reliably locate itself in the corresponding Geographical Area. Otherwise, the UE is not authorized to transmit.

Editor's note: The radio parameters (e.g. frequency bands) are to be defined by RAN WGs. The reference to RAN specification will be added when defined in RAN WGs.

NOTE 1: Whether a frequency band is "operator managed" or "non-operator managed" in a given Geographical Area is defined by local regulations.

[ . . . ]

6) Policy/parameters when NR PC5 is selected:

The mapping of service types (e.g. PSIDs or ITS-AIDS) to V2X frequencies with Geographical Area(s).

The mapping of Destination Layer-2 ID(s) and the V2X services, e.g. PSIDs or ITS-AIDS of the V2X application for broadcast.

The mapping of Destination Layer-2 ID(s) and the V2X services, e.g. PSIDs or ITS-AIDS of the V2X application for groupcast.

The mapping of default Destination Layer-2 ID(s) for initial signalling to establish unicast connection and the V2X services, e.g. PSIDs or ITS-AIDS of the V2X application.

NOTE 2: The same default Destination Layer-2 ID for unicast initial signaling can be mapped to more than one V2X services. In the case where different V2X services are mapped to distinct default Destination Layer-2 IDs, when the UE intends to establish a single unicast link that can be used for more than one V2X services, the UE can select any of the default Destination Layer-2 IDs to use for the initial signaling.

The mapping between V2X services (e.g. PSIDs or ITS-AIDS) to authorized PC5 QoS parameters (e.g. PC5 QoS parameters defined in clause 5.4.2) for UE autonomous resources selection mode.

[ . . . ]

5.2 V2X Communication 5.2.1 V2X Communication Over PC5 Reference Point 5.2.1.1 General For V2X communication, two types of PC5 reference points exist: the LTE based PC5 reference point as defined in TS 23.285 [8], and the NR based PC5 reference point as defined in clause 4.2.3. A UE may use either type of PC5 or both for V2X communication depending on the services the UE supports. The V2X communication over PC5 reference point supports roaming and inter-PLMN operations. V2X communication over PC5 reference point is supported when UE is "served by NR or E-UTRA" or when the UE is "not served by NR or E-UTRA".

A UE is authorized to transmit and receive V2X messages when it has valid authorization and configuration as specified in clause 5.1.2.

The V2X communication over PC5 reference point has the following characteristics:

V2X communication over LTE based PC5 reference point is connectionless, i.e. broadcast mode at Access Stratum (AS) layer, and there is no signalling over PC5 for connection establishment.

V2X communication over NR based PC5 reference point supports broadcast mode, groupcast mode, and unicast mode at AS layer. The UE will indicate the mode of communication for a V2X message to the AS layer. Signalling over control plane over PC5 reference point for unicast mode communication management is supported.

V2X services communication support between UEs over PC5 user plane.

V2X messages are exchanged between UEs over PC5 user plane.

Both IP based and non-IP based V2X messages are supported over PC5 reference point.

For IP based V2X messages, only IPv6 is used. IPv4 is not supported.

The identifiers used in the V2X communication over PC5 reference point are described in clause 5.6.1. UE decides on the type of PC5 reference point and Tx Profile to use for the transmission of a particular packet based on the configuration described in clause 5.1.2. When the LTE based PC5 reference point is selected, the QoS handling corresponding procedures are defined in TS 23.285 [8]. When NR based PC5 reference point is selected, the QoS handling and procedures are defined in clauses 5.4.1 and 6.3.

If the UE has an ongoing emergency session via IMS, the ongoing emergency session via IMS shall be prioritized over V2X communication over PC5 reference point.

NOTE: The emergency session via IMS setup is based on appropriate regional/national regulatory requirements and operator policies as defined in TS 23.501 [6].

[ . . . ]

5.2.1.4 Unicast Mode Communication Over PC5 Reference Point

Unicast mode of communication is only supported over NR based PC5 reference point. Figure 5.2.1.4-1 illustrates an example granularity of PC5 unicast link.

[ . . . ]

Figure 5.2.1.4-1 of 3GPP TS 23.287 V1.0.0, Entitled "Granularity of PC5 Unicast Link", is Omitted The following principles apply when the V2X communication is carried over PC5 unicast link:

The granularity of the PC5 unicast link is the same as the pair of Application Layer IDs for both UEs. Therefore, one PC5 unicast link supports one or more V2X services (e.g. PSIDs or ITS-AIDS) if the V2X services are associated with a same pair of Application Layer IDs. For example, as illustrated in Figure 5.2.1.4-1, UE A has one PC5 unicast link with a peer UE which is identified by Application Layer ID 2 and another PC5 unicast link with a peer UE which is identified by Application Layer ID 4.

NOTE: From UE A's point of view, UE A may not know that Application Layer IDs provided by a peer UE belong to the same UE. In that case UE A doesn't have to know that multiple PC5 Unicast links are associated to the same peer UE.

The UE may determine to establish a separate PC5 unicast link e.g. depending on network layer protocols (e.g. IP or non-IP).

One PC5 unicast link supports one or more PC5 QoS Flows for the same or different V2X services.

Different PC5 QoS Flows may be selected for different V2X packets as specified in clause 5.4.1.1.1.

When Application layer initiates a V2X service which requires PC5 unicast communication, the UE establishes a PC5 unicast link with the corresponding UE as specified in clause 6.3.3.1.

After successful PC5 unicast link establishment, UE A and UE B use a same pair of Layer-2 IDs for subsequent PC5-S signalling message exchange and V2X service data transmission as specified in clause 5.6.1.4. V2X layer of the transmitting UE indicates to AS layer whether the message is for PC5-S signalling message (i.e. Direct Communication Request/Accept, Link Identifier Update Request/Response, Disconnect Request/Response) or service data transmission when it sends message over the established PC5 link. V2X layer of receiving UE handles message if it is PC5-S signalling message whilst the V2X layer of receiving UE forwards the message to the upper layer if it is application data message.

The unicast mode supports per-flow QoS model as specified in clause 5.4.1.4. During the unicast link establishment, each UEs self-assign PC5 Link Identifier and associate the PC5 Link Identifier with the Unicast Link Profile for the established unicast link. The PC5 Link Identifier is a unique value within the UE. The Unicast Link Profile identified by PC5 Link Identifier includes service type(s) (e.g. PSID or ITS-AID), Application Layer ID and Layer-2 ID of UE A, Application Layer ID and Layer-2 ID of UE B and a set of PC5 QoS Flow Identifier(s) (PFI(s)). Each PFI is associated with QoS parameters (i.e. PQI and optionally Range). The PC5 Link Identifier and PFI(s) are unchanged values for the established unicast link regardless of the change of Application Layer ID and Layer-2 ID. The UE uses PFI to indicate the PC5 QoS flow to AS layer, therefore AS layer identifies the corresponding PC5 QoS flow even if the source and/or destination Layer-2 IDs are changed due to e.g. privacy support. The UE uses PC5 Link Identifier to indicate the PC5 unicast link to V2X Application layer, therefore V2X Application layer identifies the corresponding PC5 unicast link even if there are more than one unicast link associated with one service type (e.g. the UE establishes multiple unicast links with multiple UEs for a same service type).

Editor's note: It is FFS how to determine PC5 QoS Flow Identifiers, i.e. self-assigned or pre-configured.

[ . . . ]

5.4 QoS Handling for V2X Communication
5.4.1 QoS Handling for V2X Communication Over PC5 Reference Point
5.4.1.1 QoS Model
5.4.1.1.1 General Overview For LTE based PC5, the QoS handling is defined in TS 23.285 [8], based on ProSe Per-Packet Priority (PPPP) and ProSe Per-Packet Reliability (PPPR).

For NR based PC5, a QoS model similar to that defined in TS 23.501 [6] for Uu reference point is used, i.e. based on 5QIs, with additional parameter of Range. For the V2X communication over NR based PC5 reference point, a PC5 QoS Flow is associated with a PC5 QoS rule that contains the PC5 QoS parameters as defined in clause 5.4.2. A set of standardized PC5 5QIs (PQI) are defined in clause 5.4.4. The UE may be configured with a set of default PC5 QoS parameters to use for the V2X services, as defined in clause 5.1.2.1. For NR based unicast, groupcast and broadcast PC5 communication, Per-flow QoS model for PC5 QoS management shall be applied. Figure 5.4.1.1.1-1 illustrates an example mapping of Per-flow QoS model for NR PC5. Details of PC5 QoS rules and PFI related operations are described in clause 5.4.1.1.2.

Figure 9:
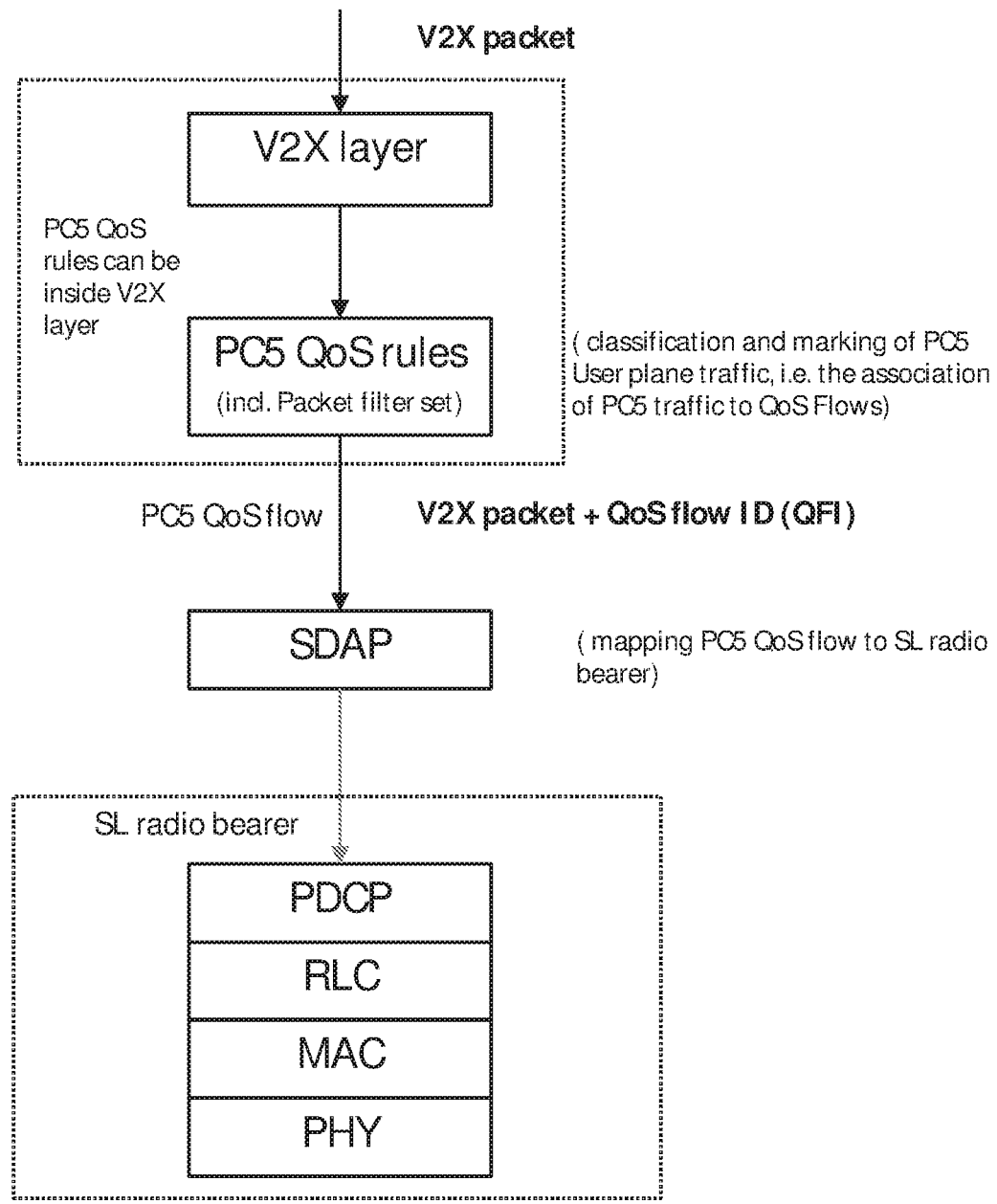
FIG. 9 is a reproduction of Figure 5.4.1.1.1-1 of 3GPP TS 23.287 V1.0.0.

Figure 5.4.1.1.1-1 of 3GPP TS 23.287 V1.0.0, Entitled "Per-Flow PC5 QoS Model for NR PC5", is Reproduced as FIG. 9

The following principles apply when the V2X communication is carried over PC5 reference point:

Application layer may set the service requirements for the V2X communication, using either TS 23.285 [8] defined PPPP and PPPR model or the PQ1 and Range model. Depends on the type of PC5 reference point, i.e. LTE based or NR based, selected for the transmission, the UE may map the application layer provided service requirements to the suitable QoS parameters to be passed to the lower layer. The mapping between the two QoS models is defined in clause 5.4.2. For V2X communication over NR based PC5, different V2X packets may require different QoS treatments. In that case, the V2X packets shall be sent from the V2X layer to the Access Stratum layer within PC5 QoS Flows identified by different PFIs.

When groupcast or unicast mode of V2X communication over NR based PC5 is used, a Range parameter is associated with the QoS parameters for the V2X communication. The Range may be provided by V2X application layer or use a default value mapped from the service type based on configuration as defined in clause 5.1.2.1. The Range indicates the minimum distance that the QoS parameters need to be fulfilled. The Range parameter is passed to AS layer together with the QoS parameters for dynamic control.

NR based PC5 supports three types of communication mode, i.e. broadcast, groupcast, and unicast. The QoS handling of these different modes are described in clauses 5.4.1.2 to 5.4.1.4.

The UE may handle broadcast, groupcast, and unicast traffic by taking all their priorities, e.g. indicated by PQIs, into account.

For broadcast and groupcast modes of V2X communication over NR based PC5, standardized PQ1 values are applied by the UE, as there is no signalling over PC5 reference point for these cases.

When network scheduled operation mode is used, the UE-PC5-AMBR for NR based PC5 applies to all types of communication modes, and is used by NG-RAN for capping the UE's NR based PC5 transmission in the resources management.

Editor's note: The support of new QoS model, including PQI and Range, depends on RAN WGs' feedback.

5.4.1.1.2 PC5 QoS Rule and PFI

The following description applies to for both network scheduled operation mode and UE autonomous resources selection mode.

For NR PC5 QoS mechanisms, "PC5 QoS rules" is defined to derive PC5 QoS parameters defined in clause 5.4.2 (i.e. PQI and conditionally other parameters such as MFBR/GFBR, etc). PFI is assigned by the UE. The following operations are applied to derive PC5 QoS parameters:

a) When V2X application layer provides service requirements for the V2X services, e.g. priority requirement, reliability requirement, delay requirement, to V2X layer, the V2X layer derives PC5 QoS parameters from the service requirements based on PC5 QoS rules;

b) Otherwise, i.e. when V2X application layer does not provide any information about service requirements for the V2X services to V2X layer, the V2X layer uses the authorized PC5 QoS parameters corresponding to the V2X service based on the mapping between V2X services types (e.g. PSID/ITS-AID) and authorized PC5 QoS parameters as defined in clause 5.1.2.1.

Editor's note: Details of PC5 QoS rules are FFS.

Editor's note: It is FFS whether other operations need to be defined for IP communication over NR PC5 to derive PC5 QoS parameters (e.g. other input than service requirements).

Editor's note: It is FFS how PC5 QoS rule operation works for non-IP communication over NR PC5.

Figure 5.4.1.1.2-1 illustrates how PC5 QoS parameters are derived for V2X communication over NR PC5.

[ . . . ]

Figure 5.4.1.1.2-1 of 3GPP TS 23.287 V1.0.0, Entitled "Deriving PC5 QoS Parameters for V2X Communication Over NR PC5", is Omitted For V2X communication over NR PC5 reference point, the PC5 QoS Flow is the finest granularity of QoS differentiation in the same destination identified by Destination Layer-2 ID. User Plane traffic with the same PFI receives the same traffic forwarding treatment (e.g. scheduling, admission threshold). The PFI is unique within a same destination. The UE assigns PFI based on the PC5 QoS parameters derived for V2X service.

Editor's note: It is FFS whether PFI and the corresponding PC5 QoS parameters need to be exchanged over PC5-S messages between two UEs for unicast link.

The UE maintains mapping of PFI to PC5 QoS parameters and the V2X service in a context per destination identified by Destination Layer-2 ID. When the UE assigns a new PFI for V2X service, the UE stores it with the corresponding PC5 QoS parameters and the V2X service (e.g. PSID or ITS-AID) in the context for the destination. When the UE releases the PFI, the UE removes it from the context for the destination. The context enables for the UE to determine whether PFI for the V2X packet for any V2X service from the V2X application layer exists already or new PFI needs to be assigned for the V2X packet. For unicast, the Unicast Link Profile defined in clause 5.2.1.4 can be used as a context to store the PFI information.

The V2X layer provides the PFI and the corresponding PC5 QoS parameters to AS layer for Per-flow QoS model operations.

5.4.1.2 QoS Handling for Broadcast Mode V2X Communication Over PC5 Reference Point When PC5 broadcast is used for the transmission of V2X service data, the following principles are followed for both network scheduled operation mode and UE autonomous resources selection mode:

PC5 QoS parameters defined in clause 5.4.2 are applied.

If the application layer provides the service requirements for the V2X services, the V2X layer determines the PC5 QoS parameters based on the PC5 QoS rules, i.e. mapping between service requirements and PC5 QoS parameters as defined in clause 5.1.2.1.

If the application layer does not provide service requirements for the V2X services, the V2X layer determines the PC5 QoS parameters based on the mapping between services types and PC5 QoS parameters as defined in clause 5.1.2.1.

The V2X layer assigns a PC5 QoS Flow Identifier (PFI) and associates the PC5 QoS parameters to the PFI.

The V2X layer provides the PFI and PC5 QoS parameters to AS layer for Per-flow QoS model operations.

The V2X layer passes the V2X service data along with PFI to the AS layer for transmission.

When the autonomous resources selection mode is used, following additional principle applies:

The UE can use the PC5 QoS parameters for PC5 QoS handling.

Editor's Note: The QoS handling for network scheduled operation mode is FFS.

5.4.1.3 QoS Handling for Groupcast Mode V2X Communication Over PC5 Reference Point The QoS handling described in clause 5.4.1.2 is applied.

5.4.1.4 QoS Handling for Unicast Mode V2X Communication Over PC5 Reference Point The QoS handling described in clause 5.4.1.2 is applied with the following additions:

The PFI and PC5 QoS parameters are negotiated during the Layer-2 link establishment procedure as described in clause 6.3.3.1.

5.4.2 PC5 QoS Parameters 5.4.2.1 PQI

A PQI is a special 5QI, as defined in clause 5.7.2.1 of TS 23.501 [6], and is used as a reference to PC5 QoS characteristics defined in clause 5.4.3, i.e. parameters that control QoS forwarding treatment for the packets over PC5 reference point.

Standardized PQI values have one-to-one mapping to a standardized combination of PC5 QoS characteristics as specified in Table 5.4.4-1.

5.4.2.2 PC5 Flow Bit Rates

For GBR QoS Flows only, the following additional PC5 QoS parameters exist:

Guaranteed Flow Bit Rate (GFBR);
Maximum Flow Bit Rate (MFBR).

The GFBR and MFBR as defined in clause 5.7.2.5 of TS 23.501 [6] are used for bit rate control on PC5 reference point over the Averaging Time Window. For PC5 communication, the same GFBR and MFBR are used for both directions.

5.4.2.3 PC5 Link Aggregated Bit Rates

A PC5 unicast link is associated with the following aggregate rate limit QoS parameter:

per link Aggregate Maximum Bit Rate (PC5 LINK-AMBR).

The PC5 LINK-AMBR limits the aggregate bit rate that can be expected to be provided across all Non-GBR QoS Flows with a peer UE over PC5 unicast link. The PC5 LINK-AMBR is measured over an AMBR averaging window which is a standardized value. The PC5 LINK-AMBR is not applicable to GBR QoS Flows.

NOTE: The AMBR averaging window is only applied to PC5 LINK-AMBR measurement.

Editor's Note: Whether PC5 LINK-AMBR is required and its relationship with UE PC5 AMBR will be reviewed based on RAN design of PC5.

5.4.2.4 Range

Editor's Note: The definition of Range will be added based on RAN's feedback.

5.4.2.5 Default Values

A UE may be configured with default values for PC5 QoS parameters for a particular service, e.g. identified by PSID/ITS-AID. The default value will be used if the corresponding PC5 QoS parameter is not provided by upper layer.

[ . . . ]

3GPP TS 36.321 V15.3.0 states:

6.1.6 MAC PDU (SL-SCH)

A MAC PDU consists of a MAC header, one or more MAC Service Data Units (MAC SDU), and optionally padding; as described in FIG. 6.1.6-4.

Both the MAC header and the MAC SDUs are of variable sizes.

A MAC PDU header consists of one SL-SCH subheader, one or more MAC PDU subheaders; each subheader except SL-SCH subheader corresponds to either a MAC SDU or padding.

The SL-SCH subheader consists of the seven header fields V/R/R/R/R/SRC/DST.

A MAC PDU subheader consists of the six header fields R/R/E/LCID/F/L but for the last subheader in the MAC PDU. The last subheader in the MAC PDU consists solely of the four header fields R/R/E/LCID. A MAC PDU subheader corresponding to padding consists of the four header fields R/R/E/LCID.

Figure 10:
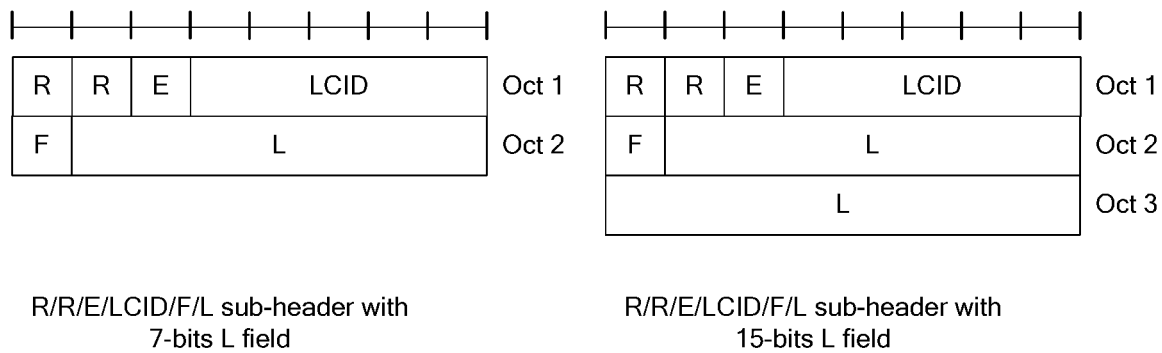
FIG. 10 is a reproduction of Figure 6.1.6-1 of 3GPP TS 36.321 V15.3.0.

Figure 6.1.6-1 of 3GPP TS 36.321 V15.3.0, Entitled "R/R/E/LCID/F/L MAC Subheader", is Reproduced as FIG. 10

Figure 11:
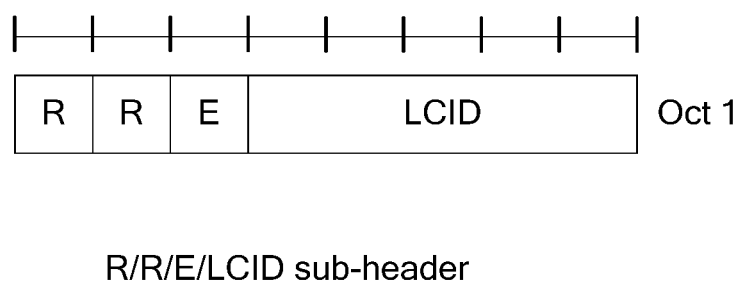
FIG. 11 is a reproduction of Figure 6.1.6-2 of 3GPP TS 36.321 V15.3.0.

Figure 6.1.6-2 of 3GPP TS 36.321 V15.3.0, Entitled "R/R/E/LCID MAC Subheader", is Reproduced as FIG. 11

[ . . . ]

MAC PDU subheaders have the same order as the corresponding MAC SDUs and padding.

Padding occurs at the end of the MAC PDU, except when single-byte or two-byte padding is required. Padding may have any value and the MAC entity shall ignore it. When padding is performed at the end of the MAC PDU, zero or more padding bytes are allowed.

When single-byte or two-byte padding is required, one or two MAC PDU subheaders corresponding to padding are placed after the SL-SCH subheader and before any other MAC PDU subheader.

A maximum of one MAC PDU can be transmitted per TB.

Figure 12:
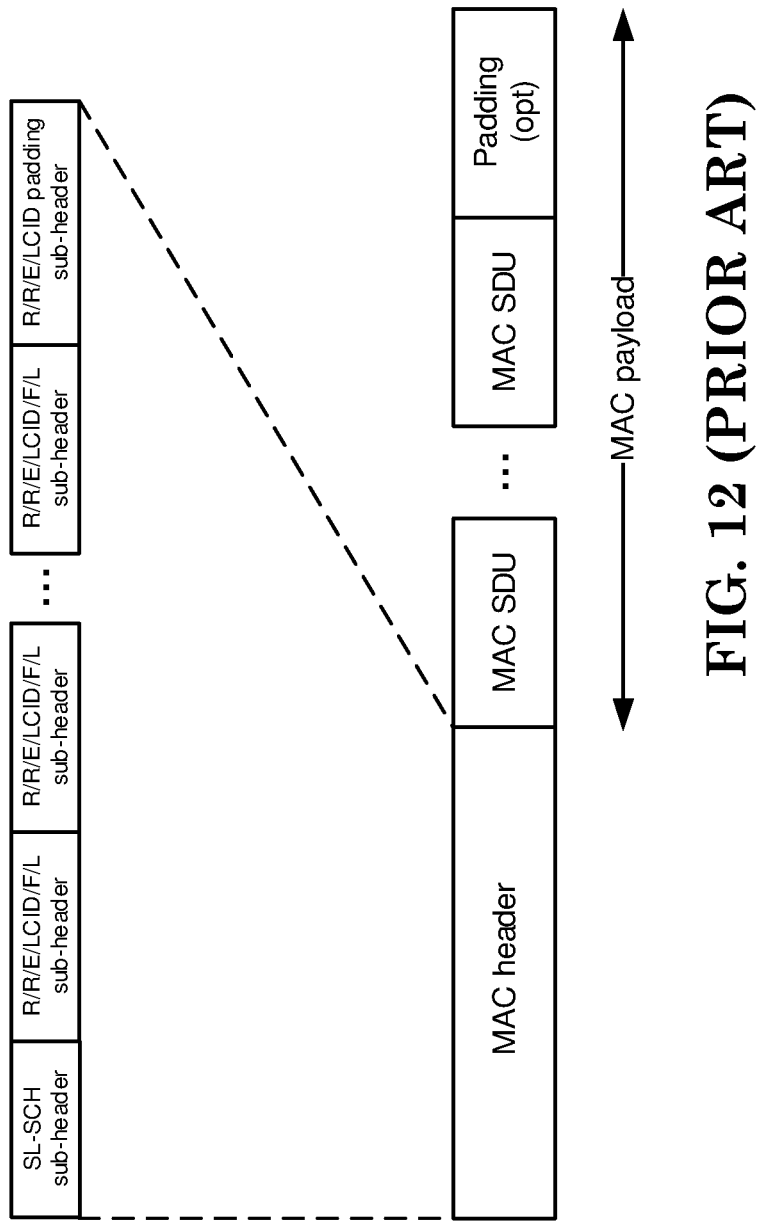
FIG. 12 is a reproduction of Figure 6.1.6-4 of 3GPP TS 36.321 V15.3.0.

Figure 6.1.6-4 of 3GPP TS 36.321 V15.3.0, Entitled "Example of MAC PDU Consisting of MAC Header, MAC SDUs and Padding", is Reproduced as FIG. 12

[ . . . ]

6.2.4 MAC Header for SL-SCH

The MAC header is of variable size and consists of the following fields:

V: The MAC PDU format version number field indicates which version of the SL-SCH subheader is used. In this version of the specification three format versions are defined, and this field shall therefore be set to "0001", "0010", and "0011". If the DST field is 24 bits this field shall be set to "0011". The V field size is 4 bits;

SRC: The Source Layer-2 ID field carries the identity of the source. It is set to the ProSe UE ID. The SRC field size is 24 bits;

DST: The DST field can be 16 bits or 24 bits. If it is 16 bits, it carries the 16 most significant bits of the Destination Layer-2 ID. If it is 24 bits, it is set to the Destination Layer-2 ID. For sidelink communication, the Destination Layer-2 ID is set to the ProSe Layer-2 Group ID or Prose UE ID. For V2X sidelink communication, the Destination Layer-2 ID is set to the identifier provided by upper layers as defined in [14]. If the V field is set to "0001", this identifier is a groupcast identifier. If the V field is set to "0010", this identifier is a unicast identifier;

LCID: The Logical Channel ID field uniquely identifies the logical channel instance within the scope of one Source Layer-2 ID and Destination Layer-2 ID pair of the corresponding MAC SDU or padding as described in table 6.2.4-1. There is one LCID field for each MAC SDU or padding included in the MAC PDU. In addition to that, one or two additional LCID fields are included in the MAC PDU, when single-byte or two-byte padding is required but cannot be achieved by padding at the end of the MAC PDU. The values of LCID from "01011" to "10100" identify the logical channels used to send duplicated RLC SDUs from logical channels of which the values of LCID from "00001" to "01010" respectively in sequential order. The LCID field size is 5 bits;

L: The Length field indicates the length of the corresponding MAC SDU in bytes. There is one L field per MAC PDU subheader except for the last subheader. The size of the L field is indicated by the F field;

F: The Format field indicates the size of the Length field as indicated in table 6.2.4-2. There is one F field per MAC PDU subheader except for the last subheader. The size of the F field is 1 bit. If the size of the MAC SDU is less than 128 bytes, the value of the F field is set to 0, otherwise it is set to 1;

E: The Extension field is a flag indicating if more fields are present in the MAC header or not. The E field is set to "1" to indicate another set of at least R/R/E/LCID fields. The E field is set to "0" to indicate that either a MAC SDU or padding starts at the next byte;

R: Reserved bit, set to "0".

The MAC header and subheaders are octet aligned.

Table 6.2.4-1 of 3GPP TS 36.321 V15.3.0, Entitled "Values of LCID for SL-SCH", is Reproduced as FIG. 13

Table 6.2.4-2 of 3GPP TS 36.321 V15.3.0, Entitled "Values of F Field:", is Reproduced as FIG. 14

3GPP R2-1907454 discloses 3 types of SLRB parameters for sidelink (SL) communications as follows:

"TX-only parameters", which are the parameters only related to TX on each SLRB (e.g. LCH-config., discard timer, etc.), "TX-RX aligned parameters", which are the parameters that are related to both TX and RX and need to be aligned between the UE and its peer UE on the corresponding SLRB (e.g. SN length, RLC mode, etc.)

"RX-only parameters", which are the parameters only related to RX on each SLRB (e.g. t-reassembly, t-reordering, etc.).

As discussed in 3GPP R2-1900370, PC5 QoS flow based pre-configuration and PC5 QoS profile based pre-configuration were introduced. Information about pre-configurations of SLRBs for all possible PC5 QoS flows is provided by the network (e.g. 5GC, V2X Control Function) beforehand. The information may include SLRB ID(s), QoS flow-to-SLRB mapping, and AS configuration (e.g. PDCP (Packet Data Convergence Protocol)/RLC (Radio Link Control)/LCH (Logical Channel) configurations). The AS configuration could indicate, for example, t-Reordering, Reordering_Window, Maximum_PDCP_SN, RLC mode (UM (Unacknowledged Mode) or AM (Acknowledged Mode)), AM_Window_Size, UM_Window_Size, identity of sidelink logical channel, and/or etc.

In NR Uu, maximum number of QFIs (64) is greater than maximum number of DRBs (32). In NR SL (Sidelink), it is possible that maximum number of PC5 QoS flows is also greater than maximum number of SLRBs. With the previous pre-configuration information, the maximum number of potential AS configurations applicable to all unicast links (established between two paired UEs) will be limited by the maximum number of SLRBs. FIG. 15 is an exemplary mapping table with maximum number of QFIs=32 and maximum number of SLRBs=16. In the exemplary mapping table shown in FIG. 15, 2 QFIs share one AS configuration mapped to one SLRB.

Limiting the maximum number of potential AS configurations applicable to all unicast links to the maximum number of SLRBs seems too restrictive. Therefore, a more flexible method is to pre-configure association between PC5 QoS flows and AS configurations in the UE and to leave SLRB IDs open. SLRB ID(s) can be (dynamically) assigned by one UE during or after the unicast link is established and then passed to the peer UE. Possibly, the initiating UE could transmit information to the peer UE. In the information, SLRB identity and PC5 QoS flow identity could be included. According to the information, the peer UE can create a SLRB using a SLRB identity indicated in the information, and apply an AS configuration associated with a PC5 QoS flow identity indicated in the information for the SLRB.

FIG. 16 is an exemplary the mapping table with maximum number of QFIs=32 and maximum number of AS configurations=24. 16 QFIs can be mapped to one AS configuration alone. It is noted that one PC5 QoS flow could be identified by a QFI (QoS Flow Identity) or PQI (PC5 5QI).

Possibly, each SLRB could be associated with one sidelink logical channel. The identity of a SLRB could be the same as or different from the identity of an associated sidelink logical channel. If the identity of the SLRB is different from the identity of the associated sidelink logical channel, the initiating UE could include the identity of the associated sidelink logical channel in the information sent to the peer UE.

Another alternative is that both UEs engaging in the unicast link individually assign SLRB IDs according to the same rule so that the mappings between SLRB IDs and AS configurations in both UEs can be aligned. For example, there is an active V2X service with 3 PC5 QoS flows (including QFI1, QFI5, and QFI18) (for V2X unicast) in a UE. The UE could store a list about association between AS configurations and PC5 QoS flows. According to the list, the AS configurations corresponding to these 3 PC5 QoS flows are AS configuration1, AS configuration3, and AS configuration10. The UE could create 3 SLRBs for these 3 PC5 QoS flows and assigns SLRB identities sequentially in the same order as these 3 PC5 QoS flows or these 3 AS configurations in the list. The initial value of the SLRB identities could be 0, and thus the UE could have SLRB0, SLRB1, and SLRB2 for these 3 SLRBs. It is also possible that the SLRB identities may be numbered after the SLRBs used for PC5 (PC5-S and/or PC5-RRC) control signalling. If the SLRBs used for PC5 control signalling occupy SLRB0 and SLRB1, then the SLRB identities for SLRBs used for traffic transfer could start from SLRB2 and thus the UE will have SLRB2, SLRB3, and SLRB4 for these 3 SLRBs. In addition to SLRB ID, an identity of the sidelink logical channel mapped to the SLRB should also be assigned by both UEs. The identity of a SLRB could be the same as or different from the identity of the mapped sidelink logical channel.

The above concept of preconfiguring the association between PC5 QoS profiles and AS configurations could be also applicable to PC5 QoS profile based pre-configuration for groupcast and/or broadcast, i.e. each UE engaging in the groupcast and/or broadcast individually assigns SLRB IDs according to the same rule so that the mappings between SLRB IDs and AS configurations in the concerned UEs can be aligned.

FIG. 17 shows an exemplary mapping table with maximum number of PQIs=32 and maximum number of AS configurations=24. 16 PQIs can be mapped to one AS configuration alone. It is noted that one PC5 QoS profile could be identified by a PQI.

For example, there is an active V2X service with 3 PC5 QoS profiles (including PQI1, PQI5, and PQI18) in a transmitting UE (for V2X groupcast). A UE could store a list about association between AS configurations and PC5 QoS profiles. According to the list, the AS configurations corresponding to these 3 PC5 QoS profiles could be AS configuration1, AS configuration3, and AS configuration10. The UE could create 3 SLRBs for these 3 PC5 QoS profiles and assigns SLRB identities sequentially in the same order as these 3 PC5 QoS profiles or these 3 AS configurations in the list. The initial value of the SLRB identities could be 0, and thus the UE could have SLRB0, SLRB1, and SLRB2 for these 3 SLRBs. It is also possible that the SLRB identities may be numbered after the SLRBs used for PC5 (PC5-S and/or PC5-RRC) control signalling. If the SLRBs used for PC5 control signalling occupy SLRB0 and SLRB1, then the SLRB identities for SLRBs used for traffic transfer could start from SLRB2, and thus the UE could have SLRB2, SLRB3, and SLRB4 for these 3 SLRBs. In addition to SLRB ID, an identity of the sidelink logical channel mapped to the SLRB should also be assigned by the UE. The identity of a SLRB could be the same as or different from the identity of the mapped sidelink logical channel.

Alternatively, SLRB ID(s) can be (dynamically) assigned by one UE during or after the groupcast is established and then passed to other UEs in the group. Possibly, the transmitting UE could transmit information to a group where the transmitting UE belongs to. In the information, SLRB identity and PC5 Qos profile could be included. According to the information, the receiving UE in the group can create a SLRB using a SLRB identity indicated in the information, and apply an AS configuration associated with a PC5 QoS profile indicated in the information for the SLRB.

Possibly, each SLRB could be associated with one sidelink logical channel. The identity of a SLRB could be the same as or different from the identity of an associated sidelink logical channel. If the identity of the SLRB is different from the identity of the associated sidelink logical channel, the transmitting UE could include the identity of the associated sidelink logical channel in the information.

A TX (Transmission) UE in RRC Connected mode may request SLRB configuration for a PC5 QoS flow of a V2X service, wherein the SLRB configuration may include TX-only parameters for the SLRB (e.g. PC5 QoS flow to SLRB mapping, LCH identity (LCID), LCH to LCG mapping, LCH priority, and discard timer, etc.). The PC5 QoS flow to SLRB mapping may indicate a SLRB ID. Part of these TX-only parameters may be included in a LCH configuration. One SLRB may be associated with one sidelink LCH (if sidelink duplication is not applied) or two sidelink LCHs (if sidelink duplication is applied). In this application, one sidelink LCH (SL LCH) is the main focus. But, this does not exclude the solutions to be applied to the sidelink duplication.

When establishing a SLRB and/or a SL LCH, the TX UE may need to combine the TX-only parameters assigned by gNB for the SLRB/SL LCH and the TX-RX aligned parameters predefined or preconfigured in the TX UE in case of groupcast and broadcast communications. The predefinition or pre-configuration could be specified in a RRC protocol specification. In the current V2X parameter provisioning, the parameters could be generally associated with a V2X service (e.g. the mapping between V2X services and Destination Layer-2 IDs for groupcast and broadcast communications). Following the same concept, each set of TX-RX aligned parameters predefined or preconfigured in the TX UE may be associated with a PC5 QoS flow of a V2X service so that the TX UE can determine or select the set of TX-RX aligned parameters based on the PC5 QoS flow of the concerned V2X service. However, in this situation the table or list of TX-RX aligned parameters would be quite large because there are many V2X services to support and each V2X service may include multiple PC5 QoS flows.

Since the TX-RX aligned parameters may depend on the QoS requirements of each PC5 QoS flow, irrespective of which V2X service the PC5 QoS flow belongs to. Therefore, a simpler way is to associate the TX-only parameters and the TX-RX aligned parameters via a PC5 QoS Identifier (PQI) corresponding to the PC5 QoS flow. By this way, each PQI could be mapped to one set of TX-RX aligned parameters for a SLRB or SL LCH. It is possible that multiple PQIs may be mapped to the same set of TX-RX aligned parameters.

When receiving a SL data block (e.g. a MAC PDU), the RX UE may need to determine the TX-RX aligned parameters (e.g. RLC parameters) for further processing content of the SL data block according to the LCID included in the MAC header. Therefore, the association between LCIDs and TX-RX aligned parameters should be predefined or preconfigured in the RX UE. Similarly, such predefinition or pre-configuration could be specified in a RRC protocol specification.

One potential solution is to include LCID in the table for defining the TX-RX aligned parameters (e.g., the exemplary table shown in FIG. 18)), wherein each LCID is associated with one set of TX-RX aligned parameters and at least one PQI is associated with one set of TX-RX aligned parameters. FIG. 18 provides an example of such table (with each LCIDs as a key index). In case the maximum number of PQIs is greater than the maximum number of LCIDs, multiple PQIs may be mapped to one LCID and one set of TX-RX aligned parameters. With this table, the RX UE could determine the set of TX-RX aligned parameters for further processing content of a received data block according to the LCID included in the MAC header. Besides, the TX UE could also determine the set of TX-RX aligned parameters when establishing a SLRB or a SL LCH for a PC5 QoS flow associated with a PC5 QoS Identifier (PQI).

With the LCID specified in the table shown in FIG. 18, it is not necessary for gNB to include LCID in the SLRB configuration sent to the TX UE in response to SLRB configuration request. To align with other cases (e.g. SLRB configuration for a unicast communication), it is also fine to include LCID in the SLRB configuration (because gNB is also aware of the mapping and thus is able to assign the right LCID). In this situation, it is better for the TX UE to check whether the LCID assigned by gNB is equal to the one predefined or preconfigured in the TX UE. If mismatch (e.g. a LCID of a SL LCH assigned by gNB for a PC5 QoS flow is different from a LCID which is predefined or preconfigured in the TX UE and is associated with a PQI of the PC5 QoS flow) is detected, the TX UE may take certain action to notify gNB of this error so that gNB could check and correct the error. For example, the TX UE may initiate a RRC connection re-establishment procedure. The TX UE may set the reestablishmentCause in the RRCReestablishmentRequest message to a value of reconfigurationFailure. Alternatively, instead of performing the RRC connection re-establishment procedure, the TX UE may keep the current RRC connection with the gNB and transmit an indication to notify the gNB of the error. The indication could be included in a RRC message.

In LTE sidelink, the LCID field size is 5 bits. 00001-01010 are allocated for identities of the logical channels, while 01011-10100 are allocated for identities of the duplication logical channels. Thus, in fact only 10 LCIDs are available for SL LCHs without duplication. In this situation, there could be 10 sets of TX-RX aligned parameters available for SLRB/SL LCH configurations. Basically, 10 is the maximum number of LCHs per V2X service. Since there could be different varieties of V2X services to support in NR and different PC5 QoS flows of V2X services may have different QoS requirements, it may be too restrictive to limit the maximum sets of TX-RX aligned parameters (to be applied to all V2X services) to the maximum number of LCHs (to be created for one V2X service). Thus, other more flexible ways for the RX UE to know the LCID for each set of TX-RX aligned parameters predefined or preconfigured in the RX UE could be considered.

Assume PQI is used as a key index in the table or list for defining the TX-RX aligned parameters and LCID is not included in the table. FIG. 19 provides an example of such table or list (with each PQI as a key index). Each PQI in the table could be associated with one set of TX-RX aligned parameters for a SLRB or SL LCH. It is possible that multiple PQIs may be mapped to the same set of TX-RX aligned parameters.

As shown in the exemplary table shown in FIG. 19, each PQI could be mapped to one set of TX-RX aligned parameters and thus this solution could better meet different QoS requirements of V2X services in NR than the solution shown in the exemplary table illustrated in FIG. 18.

The above concepts could also be applied to SLRB or SL LCH creation based on pre-configuration for sidelink groupcast, broadcast, or unicast communications, wherein the content of the table or list may include other information in addition to the TX-RX aligned parameters (e.g. TX-only parameters and/or RX-only parameters). Each entry in the table or list may include a SLRB or SL LCH configuration, wherein each SLRB is associated with one SL LCH if no sidelink duplication is applied to this SLRB. One SLRB may be associated with two SL LCHs if sidelink duplication is applied. Parameter pre-configuration may be done either via V2X Control Function or gNB (e.g. using system information).

Another alternative is for the TX UE to transmit a PQI to LCID mapping of a V2X service to the RX UE in a PC5 RRC message on a SL control channel (SCCH). It is possible that the PC5 RRC message could be transmitted via a unicast communication to a peer UE before V2X message transmission to the peer UE starts on the concerned SL LCH (or SLRB). The LCID may be assigned by the TX UE. The SLRB configuration and/or the SL LCH configuration of the SL control channel (SCCH) may be predefined or preconfigured in the UE. Possibly, the SLRB configuration and/or the SL LCH configuration of the SCCH could be specified in a RRC protocol specification. The unicast communication could be addressed to a Layer-2 ID of the peer UE.

Figure 20:
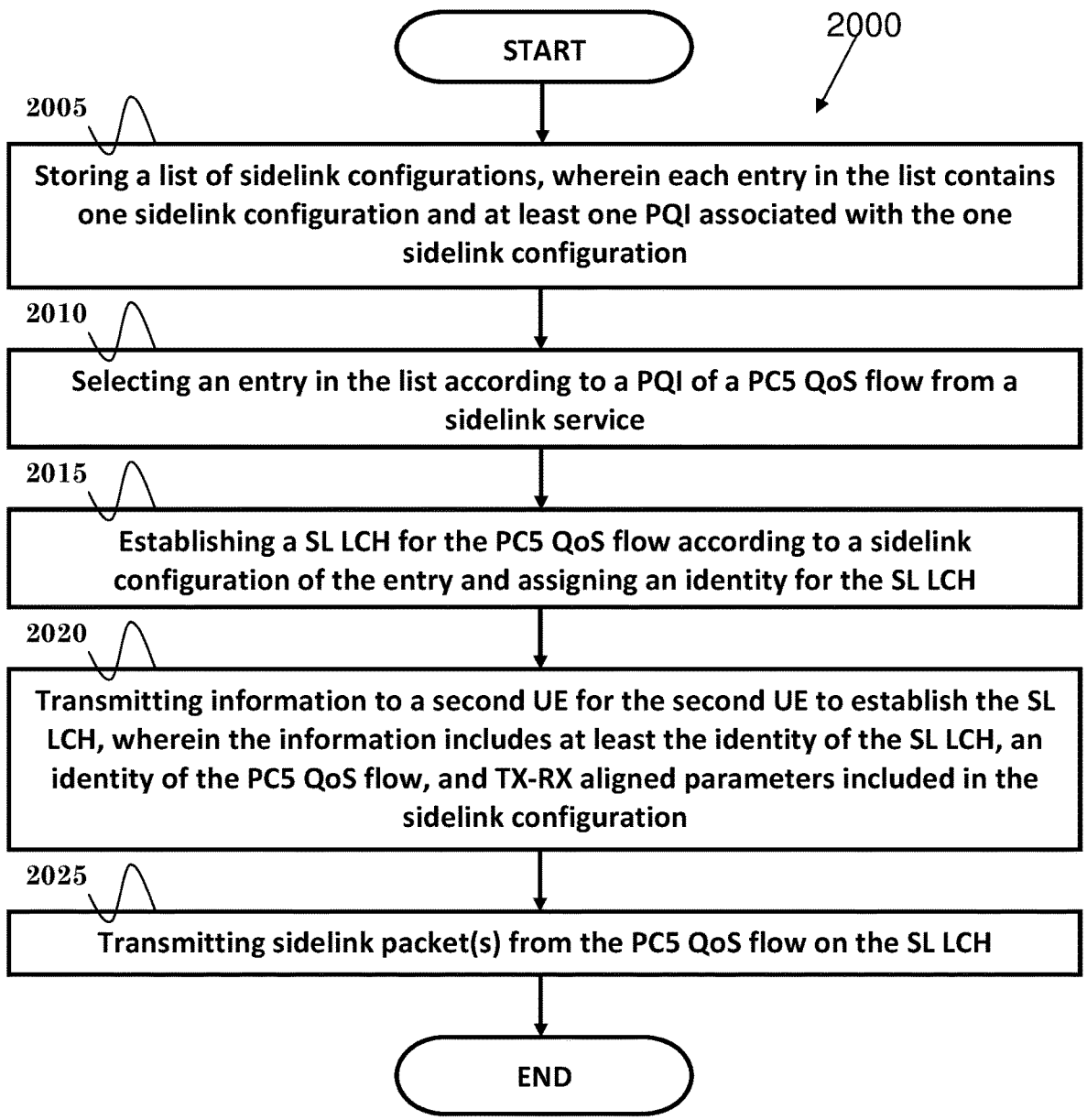
FIG. 20 is a flow chart according to one exemplary embodiment.

FIG. 20 is a flow chart 2000 according to one exemplary embodiment from the perspective of a first UE for the first UE to perform SL LCH establishment. In step 2005, the first UE stores a list of sidelink configurations, wherein each entry in the list contains one sidelink configuration and at least one PC5 QoS identifier (PQI) associated with the one sidelink configuration. In step 2010, the first UE selects an entry in the list according to a PQI of a PC5 QoS flow from a sidelink service. In step 2015, the first UE establishes a SL LCH for the PC5 QoS flow according to a sidelink configuration of the entry and assigning an identity for the SL LCH. In step 2020, the first UE transmits information to a second UE for the second UE to establish the SL LCH, wherein the information includes at least the identity of the SL LCH, an identity of the PC5 QoS flow, and Transmission-Reception (TX-RX) aligned parameters included in the sidelink configuration. In step 2025, the first UE transmits sidelink packet(s) from the PC5 QoS flow on the SL LCH.

In one embodiment, each sidelink configuration may also include TX-only parameters. The information could be transmitted after a unicast link has been established between the first UE and the second UE. Furthermore, the information could be transmitted via a PC5 Radio Resource Control (RRC) message.

In one embodiment, the list of sidelink configurations could be predefined in the first UE or could be provisioned via a system information broadcasted by a base station (e.g. gNB). In one embodiment, the list of sidelink configurations could be specified in a standard specification (e.g. RRC Specification).

In one embodiment, the TX-RX aligned parameters could be the parameters that are related to both TX and RX and need to be aligned between the first UE and the second UE on the SL LCH (e.g. SN length, RLC mode, etc.). Each entry in the list may not include any identity of SL LCH.

Referring back to FIGS. 3 and 4, in one exemplary embodiment of a first UE, the device 300 includes a program code 312 stored in the memory 310. The CPU 308 could execute program code 312 to enable the UE (i) to store a list of sidelink configurations, wherein each entry in the list contains one sidelink configuration and at least one PC5 PQI associated with the one sidelink configuration, (ii) to select an entry in the list according to a PQI of a PC5 QoS flow from a sidelink service, (iii) to establish a SL LCH for the PC5 QoS flow according to a sidelink configuration of the entry and assigning an identity for the SL LCH, (iv) to transmit information to a second UE for the second UE to establish the SL LCH, wherein the information includes at least the identity of the SL LCH, an identity of the PC5 QoS flow, and TX-RX aligned parameters included in the sidelink configuration, and (v) to transmit sidelink packet(s) from the PC5 QoS flow on the SL LCH. Furthermore, the CPU 308 can execute the program code 312 to perform all of the above-described actions and steps or others described herein.

Figure 21:
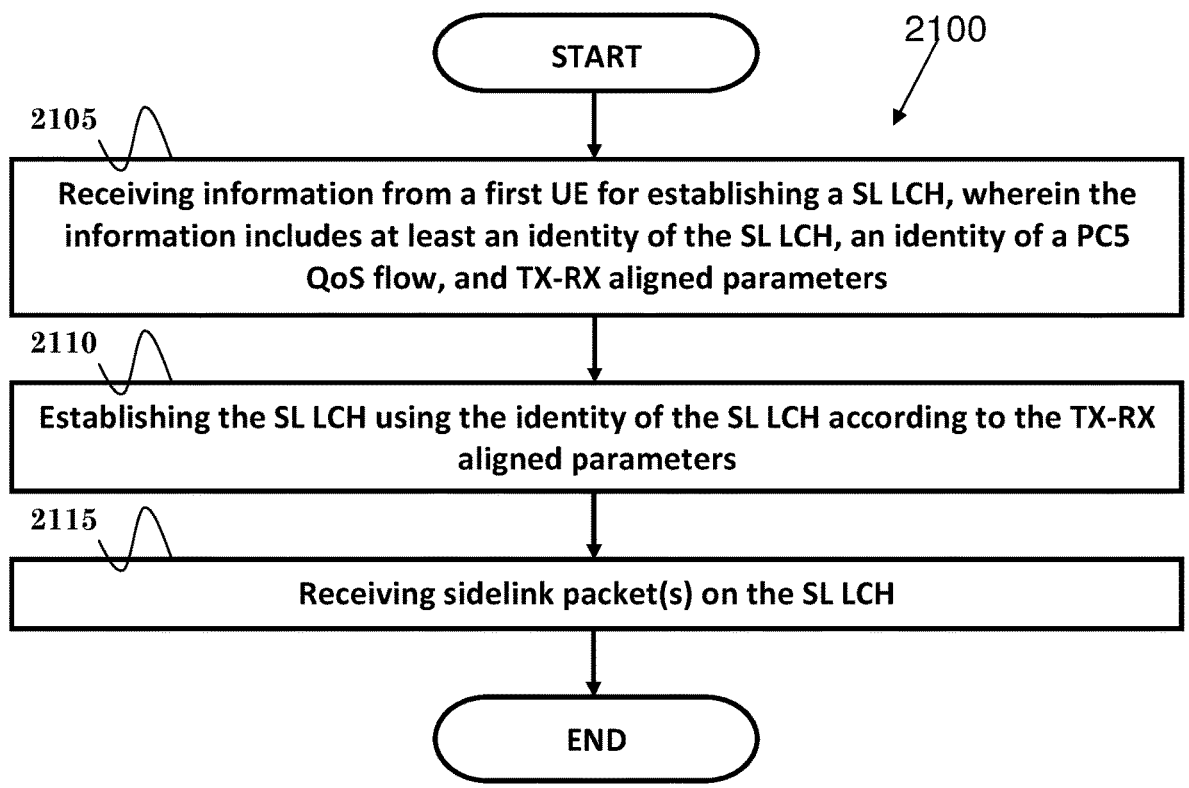
FIG. 21 is a flow chart according to one exemplary embodiment.

FIG. 21 is a flow chart 2100 according to one exemplary embodiment from the perspective of a second UE for the second UE to perform SL LCH establishment. In step 2105, the second UE receives information from a first UE for establishing a SL LCH, wherein the information includes at least an identity of the SL LCH, an identity of a PC5 QoS flow, and TX-RX aligned parameters. In step 2110, the second UE establishes the SL LCH using the identity of SL LCH according to the TX-RX aligned parameters. In step 2115, the second UE receives sidelink packet(s) on the SL LCH.

In one embodiment, the information could be received via a PC5 (Radio Resource Control) RRC message. The TX-RX aligned parameters could be the parameters that are related to both TX and RX and need to be aligned between the first UE and the second UE on the SL LCH (e.g. SN length, RLC mode, etc.).

Referring back to FIGS. 3 and 4, in one exemplary embodiment of a first UE, the device 300 includes a program code 312 stored in the memory 310. The CPU 308 could execute program code 312 to enable the UE (i) to receive information from a first UE for establishing a SL LCH, wherein the information includes at least an identity of the SL LCH, an identity of a PC5 QoS flow, and TX-RX aligned parameters, (ii) to establish the SL LCH using the identity of the SL LCH according to the TX-RX aligned parameters, and (iii) to receive sidelink packet(s) on the SL LCH. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a first UE (User Equipment) to perform sidelink logical channel (SL LCH) establishment, comprising:
   storing a list of sidelink radio bearer (SLRB) configurations, wherein each entry in the list contains one SLRB configuration and at least one PC5 QoS identifier (PQI) associated with the one SLRB configuration, wherein each SLRB configuration includes at least a Sequence Number (SN) length and a Radio Link Control (RLC) mode and includes no SL LCH identity;
   selecting an entry in the list according to a PQI of a PC5 QoS flow from a sidelink service;
   establishing a SL LCH for the PC5 QoS flow with at least the SN length and the RLC mode included in a SLRB configuration of the entry and assigning an identity for the SL LCH;
   transmitting information to a second UE for the second UE to establish the SL LCH, wherein the information includes at least the identity of the SL LCH, an identity of the PC5 QoS flow, and the SN length and the RLC mode included in the SLRB configuration; and transmitting sidelink packet(s) from the PC5 QoS flow on the SL LCH.

2. The method of claim 1, wherein each sidelink configuration also includes TX-only parameters, and wherein the TX-only parameters are parameters that are used for the first UE to perform transmission on the SL LCH associated with the sidelink configuration.

3. The method of claim 1, wherein the information is transmitted after a unicast link has been established between the first UE and the second UE.

4. The method of claim 1, wherein the information is transmitted via a PC5 Radio Resource Control (RRC) message.

5. The method of claim 1, wherein the list of sidelink configurations are predefined in the first UE or provisioned via a system information broadcasted by a base station.

6. A first communication device, comprising:
a control circuit;
a processor installed in the control circuit; and
a memory installed in the control circuit and operatively coupled to the processor;
wherein the processor is configured to execute a program code stored in the memory to:
store a list of sidelink radio bearer (SLRB) configurations, wherein each entry in the list contains one SLRB configuration and at least one PC5 QoS identifier (PQI) associated with the one SLRB configuration, wherein each SLRB configuration includes at least a Sequence Number (SN) length and a Radio Link Control (RLC) mode and includes no SL LCH identity;

select an entry in the list according to a PQI of a PC5 QoS flow from a sidelink service;
establish a SL LCH for the PC5 QoS flow with at least the SN length and the RLC mode included in a SLRB configuration of the entry and assigning an identity for the SL LCH;
transmit information to a second UE for the second UE to establish the SL LCH, wherein the information includes at least the identity of the SL LCH, an identity of the PC5 QoS flow, and the SN length and the RLC mode included in the SLRB configuration; and
transmit sidelink packet(s) from the PC5 QoS flow on the SL LCH.

7. The first communication device of claim 6, wherein each sidelink configuration also includes TX-only parameters and wherein the TX-only parameters are parameters that are used for the first communication device to perform transmission on the SL LCH associated with the sidelink configuration.

8. The first communication device of claim 6, wherein the information is transmitted after a unicast link has been established between the first communication device and the second communication device.

9. The first communication device of claim 6, wherein the information is transmitted via a PC5 Radio Resource Control (RRC) message.

10. The first communication device of claim 6, wherein the list of sidelink configurations are predefined in the first communication device or provisioned via a system information broadcasted by a base station.

* * * * *